United States Patent [19]

Yoshihara et al.

[11] Patent Number: 5,465,163
[45] Date of Patent: Nov. 7, 1995

[54] IMAGE PROCESSING METHOD AND APPARATUS FOR PROCESSING OVERSIZED ORIGINAL IMAGES AND FOR SYNTHESIZING MULTIPLE IMAGES

[75] Inventors: Kunio Yoshihara, Sagamihara; Kazuhiko Hirooka, Tokyo; Masanori Sakai; Keiju Kuboki, both of Yokohama; Mitsuo Nimura, Kawasaki; Ritsushi Tanabe, Yokohama, all of Japan

[73] Assignee: Canon Kabushiki Kaisha, Tokyo, Japan

[21] Appl. No.: 846,585

[22] Filed: Mar. 5, 1992

[30] Foreign Application Priority Data

| Mar. 18, 1991 | [JP] | Japan | 3-078611 |
| Apr. 12, 1991 | [JP] | Japan | 3-079635 |
| Jul. 19, 1991 | [JP] | Japan | 3-179149 |
| Jul. 31, 1991 | [JP] | Japan | 3-214740 |
| Jul. 31, 1991 | [JP] | Japan | 3-214741 |
| Jul. 31, 1991 | [JP] | Japan | 3-214742 |

[51] Int. Cl.⁶ ............. H04N 1/21; H04N 1/387; H04N 1/393; G06K 9/46; G06K 9/68
[52] U.S. Cl. ............. 358/444; 358/450; 358/451; 382/199; 382/217; 382/284; 382/287; 382/298; 382/218; 382/305
[58] Field of Search ............. 358/450, 451, 358/452, 453, 462, 464, 443, 448, 444; 382/16, 19, 22, 30, 61, 44, 45, 47

[56] References Cited

U.S. PATENT DOCUMENTS

| 4,538,183 | 8/1985 | Kanno et al. | 358/452 |
| 4,652,936 | 3/1987 | Hatayama | 358/450 |
| 4,692,812 | 9/1987 | Hirahara et al. | 358/443 |
| 5,113,267 | 5/1992 | Lee | 358/450 |
| 5,140,440 | 8/1992 | Sasaki | 358/452 |

*Primary Examiner*—Scott A. Rogers
*Attorney, Agent, or Firm*—Fitzpatrick, Cella, Harper & Scinto

[57] ABSTRACT

An image processing apparatus includes an input unit for inputting images, and storage units for storing the images input from the input unit. The storage units store a plurality of images having common partial images. The apparatus further includes a determination unit for determining positions of the respective overlapped common partial images of the plurality of images stored in the storage units, a synthesis unit for forming an image by synthesizing the plurality of images according to a result of the determination by the determination unit, and an output unit for outputting the image synthesized by the synthesis unit.

28 Claims, 33 Drawing Sheets

ORIGINAL IMAGE

READ IMAGE STORED IN BIT-MAP MEMORY 341

READ IMAGE STORED IN BIT-MAP MEMORY 341a

READ IMAGE STORED IN BIT-MAP MEMORY 341b

READ IMAGE STORED IN BIT-MAP MEMORY 341c

OUTPUT IMAGE

ORIGINAL 1

ORIGINAL 2

BIT-MAP MEMORY 1

BIT-MAP MEMORY 2

A3 MEMORY

FIG. 11(1)
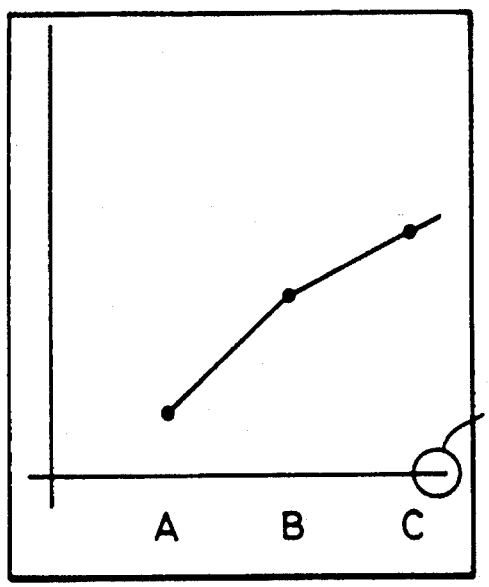
ORIGINAL 3
FIG. 11(2)
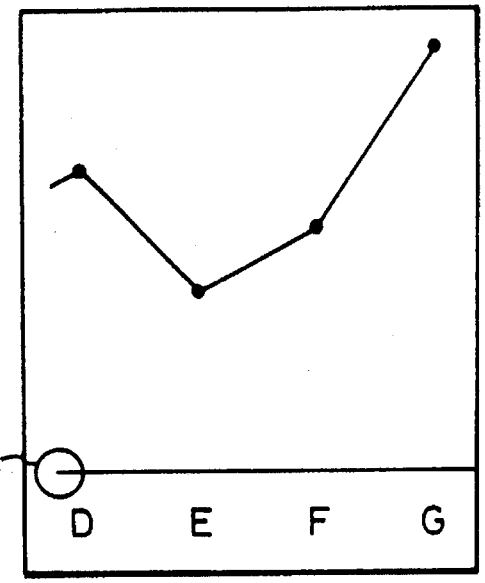
ORIGINAL 4
FIG. 11(3)
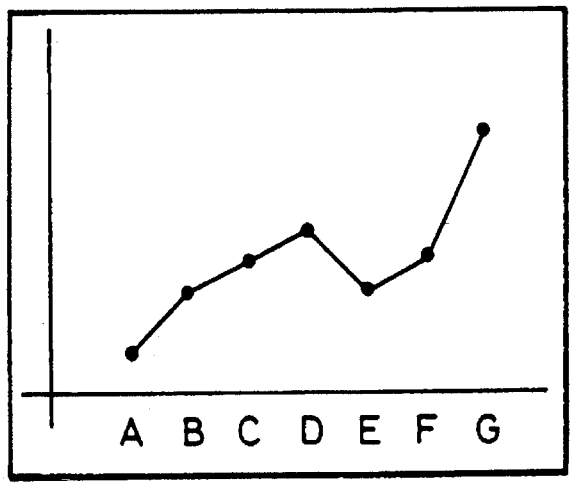
A3 MEMORY

FIG. 12(1)
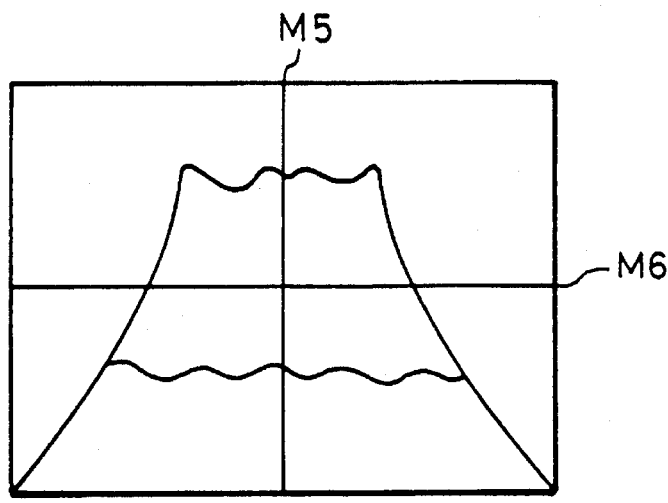
FIG. 12(2)
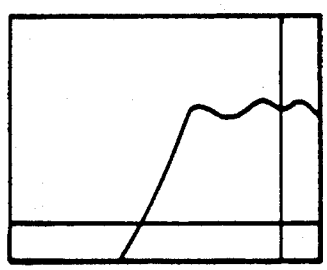
FIG. 12(3)
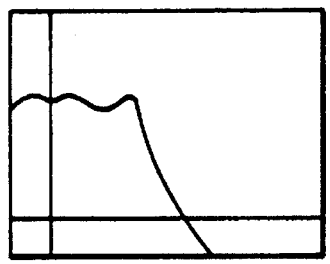
FIG. 12(4)
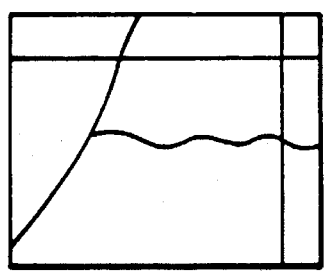
FIG. 12(5)
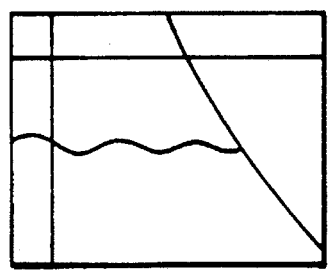
⇩ FIG. 12(6)
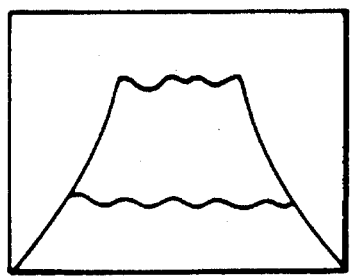

FIG. 13(1)
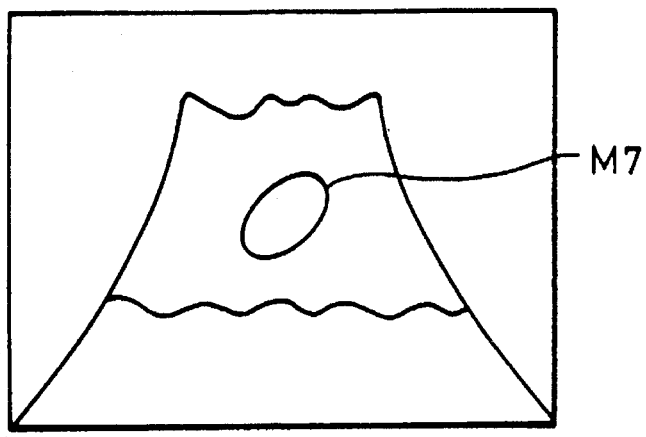
FIG. 13(2)  FIG. 13(3)
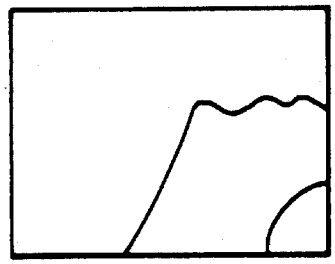 
FIG. 13(4)  FIG. 13(5)
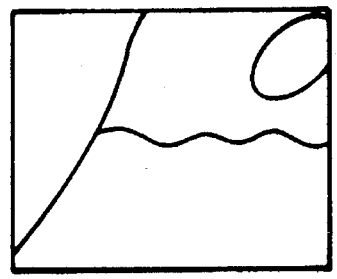 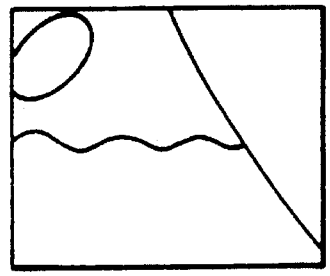
⇩ FIG. 13(6)
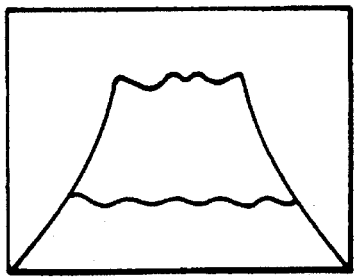

SKIP

OPERATION UNIT PANEL

FIG. 36(a)
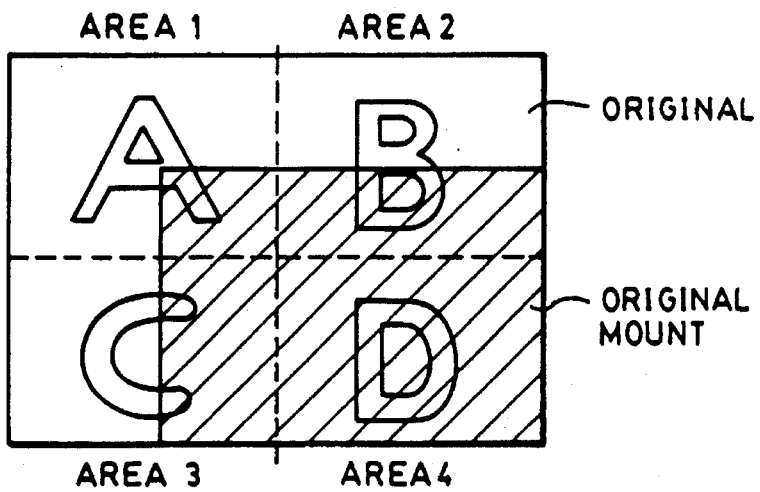
FIG. 36(b)
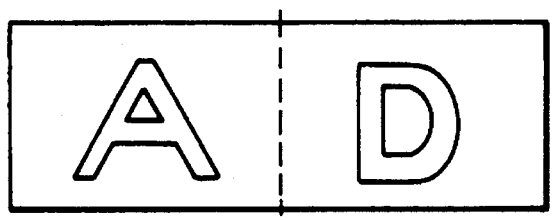
FIG. 37
(PRIOR ART)
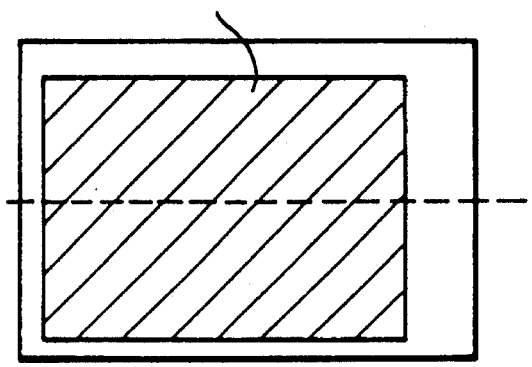
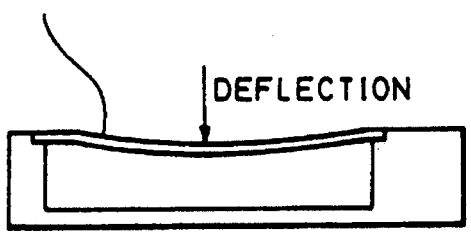
CROSS-SECTIONAL VIEW ALONG BROKEN-LINE PORTION ved in which an area is assigned for each of a plurality of
IMAGE PROCESSING METHOD AND APPARATUS FOR PROCESSING OVERSIZED ORIGINAL IMAGES AND FOR SYNTHESIZING MULTIPLE IMAGES

BACKGROUND OF THE INVENTION

1. Field of the Invention

This invention relates to an image processing apparatus which reads an image of an original, performs processing for the read image, and outputs a processed image.

2. Description of the Related Art

Copiers have been known in which an image of an original is read, and the read image is recorded on paper or the like. In such a conventional copier, when it is desired to obtain an output image of an image of an original having a size so large that a reading unit of the copier cannot read the image in a single reading operation, the image of the original is, for example, divided into four portions, the respective portions are read, the read images are individually recorded, and the operator connects four recorded images to provide one image.

However, this approach has the problem that the operator must paste a plurality of recorded images in order to connect them, and the operation of pasting images is troublesome.

Copiers having an editing function have also been provided in which an area is assigned for each of a plurality of images of an original, respective images of assigned areas are synthesized, and a synthesized image is output.

In such a copier, an area is assigned, for example, by inputting the numerical values of coordinates using keys on an operation unit while watching an original, or by inputting the position of coordinates by pressing a pad surface of a digitizer with a pen point. By such an operation, images other than those in assigned areas are erased from image data received in the copier, and output images are synthesized by transferring a plurality of images on a single sheet of recording paper.

In such an approach, however, a troublesome operation is needed, since areas must be manually assigned. Furthermore, a high-degree of skill is needed for performing exact positioning in order to connect a plurality of images, and a difficult operation must be performed.

Recently, needs for large-size originals, such as maps, PERT charts, CAD drawings and the like, have increased. For such needs, digital color copiers which can read large-size, such as the A1 size or the like, originals have been proposed.

However, the sizes of not a few actual large-size originals exceed the A1 size, for example, the B1 size, the A0 size and the like. It is possible to propose an image reading apparatus having a much larger original mount. Such an apparatus, however, has the disadvantages that original-mount glass is deflected by its own weight, whereby the distance between an image pick-up device and an original differs at a surrounding portion and at a central portion, adversely influencing an image and increasing installation space.

It is also possible to provide a sheet feed mechanism, which moves a scanner only in the main scanning direction, and moves an original in the sub-scanning direction, in a reader unit. In such a mechanism, the size of the original is not limited at least in the sub-scanning direction.

In an apparatus including such a reader unit, however, an original to be set must be in the form of a sheet, and a reading operation is limited by the size of an original.

Furthermore, such an apparatus also has the disadvantages that in order to move an original in the above-described manner, control for obtaining accuracy is difficult, and the production cost will be increased.

SUMMARY OF THE INVENTION

It is an object of the present invention to provide an improved image processing apparatus.

It is a further object of the present invention to provide an image processing apparatus which can obtain entirety of an image of an original having a size so large that it cannot be read by a single reading operation.

It is a still further object of the present invention to provide an image processing apparatus which can perform connecting processing of images read in a plurality of reading operations.

It is still another object of the present invention to provide an image forming apparatus which can easily synthesize images.

These and other objects and features of the present invention will become more apparent from the following description of the preferred embodiments taken in connection with the accompanying drawings.

BRIEF DESCRIPTION OF THE DRAWINGS

FIGS. 11(1)–11(3) are diagrams showing a specific example of original images and a synthesized image processed in the second embodiment;

FIGS. 12(1)–12(6) are diagrams showing a specific example of an original image, read images and a synthesized image in a third embodiment of the present invention;

FIGS. 13(1)–13(6) are diagrams showing a specific example of an original image, divided images and a synthesized image in the third embodiment;

FIGS. 36(a) and 36(b) are diagrams showing a layout of printout in the seventh embodiment;

FIG. 37 comprises diagrams illustrating inconvenience in a conventional approach.

DESCRIPTION OF THE PREFERRED EMBODIMENTS

Figure 1:
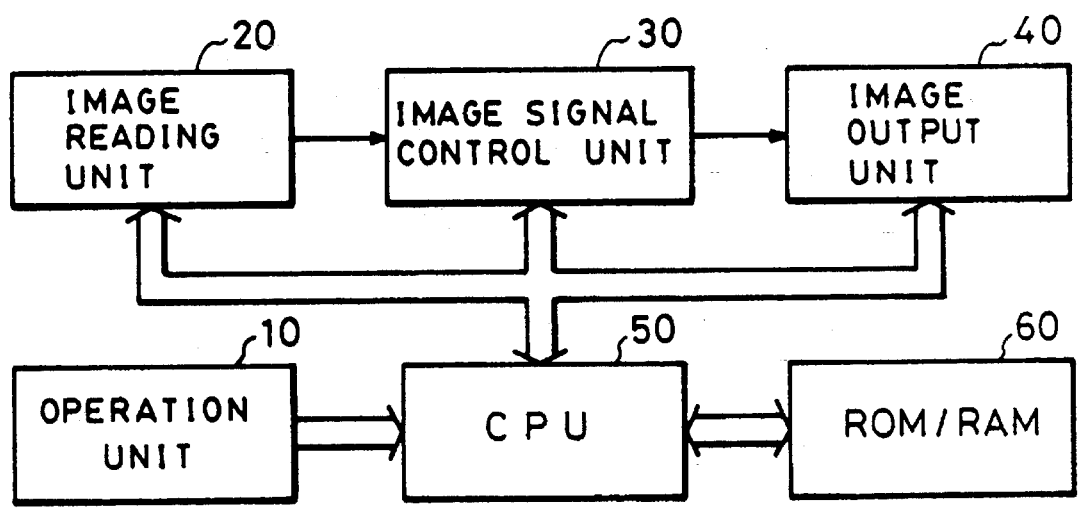
FIG. 1 is a block diagram of a first embodiment of the present invention.
Figure 2:
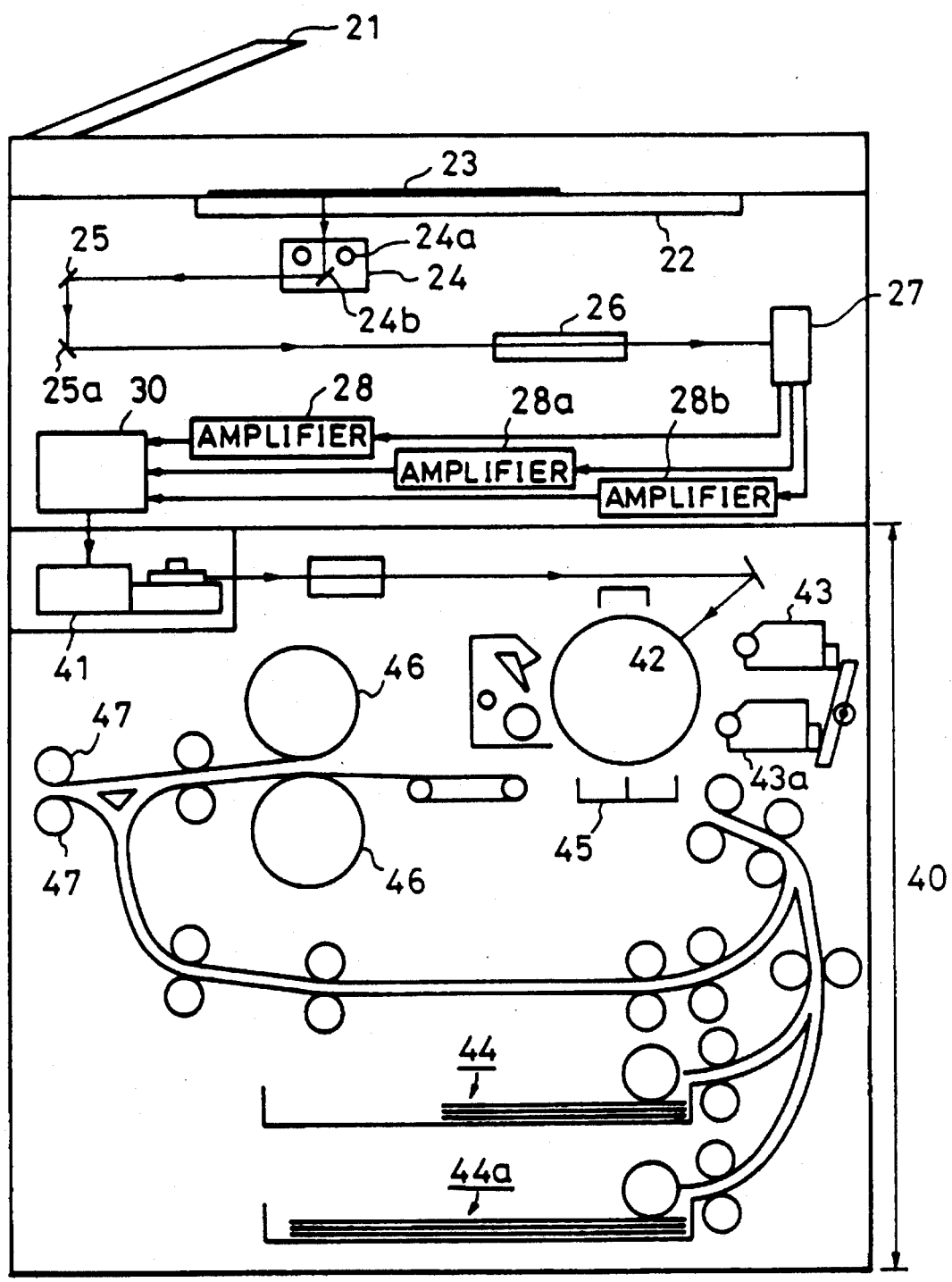
FIG. 2 is a vertical cross-sectional view of a copier of the first embodiment.

FIG. 1 is a block diagram showing a first embodiment of the present invention. FIG. 2 is a vertical cross-sectional view of a copier of the first embodiment.

The first embodiment shown in FIG. 1 comprises an operation unit 10, an image reading unit 20 for reading an original image (an original having an image), an image signal control unit 30 for storing the read image obtained by reading the original image and performing image processing, such as reduction, synthesis and the like, for the read image, an image output unit 40 for outputting the read image, a CPU (central processing unit) 50 for controlling the respective units, and a ROM (read-only memory)/RAM (random access memory) 60 used for storing control programs for the CPU 50, or used as work areas.

The operation unit 10 includes a group of keys to be depressed when modes, such as a normal copy mode, a large-size size original mode and the like are set, a read key (not shown) to be depressed when an image original is read, a read-end key (not shown) to be depressed when a reading operation of an image original is terminated, and the like. The normal copy mode is a mode of outputting a read image without synthesizing it when an image original has been read by the image reading unit 20. The large-size original mode is a mode of dividing an image original larger than an image original which can be read at one reading operation by the image reading unit 20, reading divided images a plurality of times by the image reading unit 20, synthesizing read images, and outputting a synthesizing image.

Figure 3:
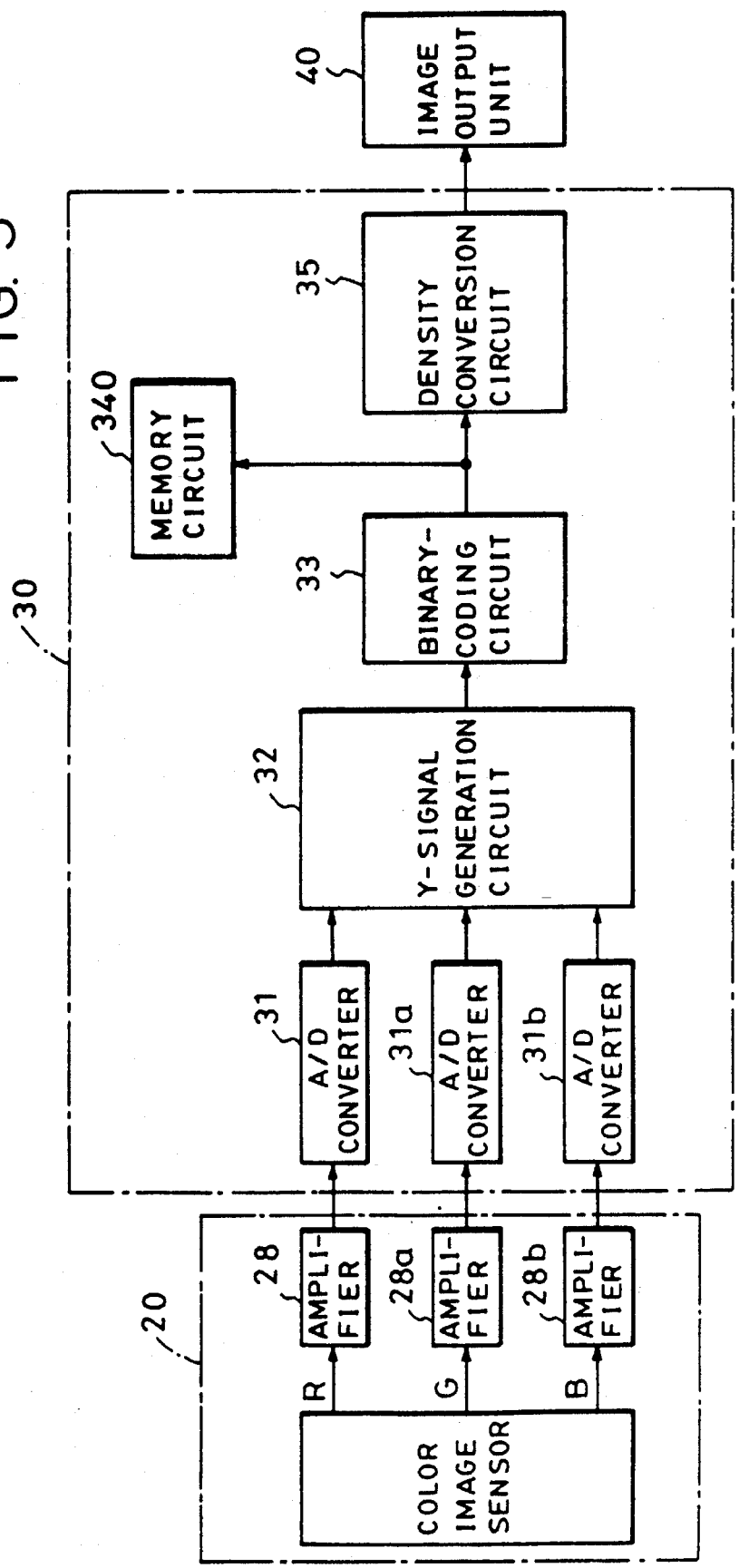
FIG. 3 is a diagram showing the detail of an image reading unit 20 and an image signal control unit 30 shown in FIG. 1.

FIG. 3 is a diagram showing the detail of the image reading unit 20 and the image signal control unit 30 shown in FIG. 1.

The image reading unit 20 comprises an original feed device 21, original mount glass 22, a scanner unit 24, mirrors 25 and 25a, a lens 26, a color image sensor 27, amplifiers 28, 28a and 28b, and the like. The image reading unit 20, which is an example of a reading means for reading an image, optically reads an image original 23, converts read optical signals into electric analog three-primary-color signals, and amplifies converted three-primary-color signals.

The image signal control unit 30 comprises A/D converters 31, 31a and 31b, a Y-signal generation circuit 32, a binary-coding circuit 33, a memory circuit 340, and a density conversion circuit 35. The A/D converters 31, 31a and 31b convert analog three primary color signals into digital three-primary-color signals. The Y signal generation circuit 32 generates a luminance signal according to three-primary-color signals received from the A/D converters 31, 31a and 31b. If the luminance signal is represented by Y, and the three primary color signals are represented by R, G and B, the luminance signal Y is obtained from the following expression:

$$Y=0.30R+0.59G+0.11B.$$

The binary-coding circuit 33 converts a multivalue luminance signal received from the Y signal generation circuit 32 into a binary image signal.

Figure 4:
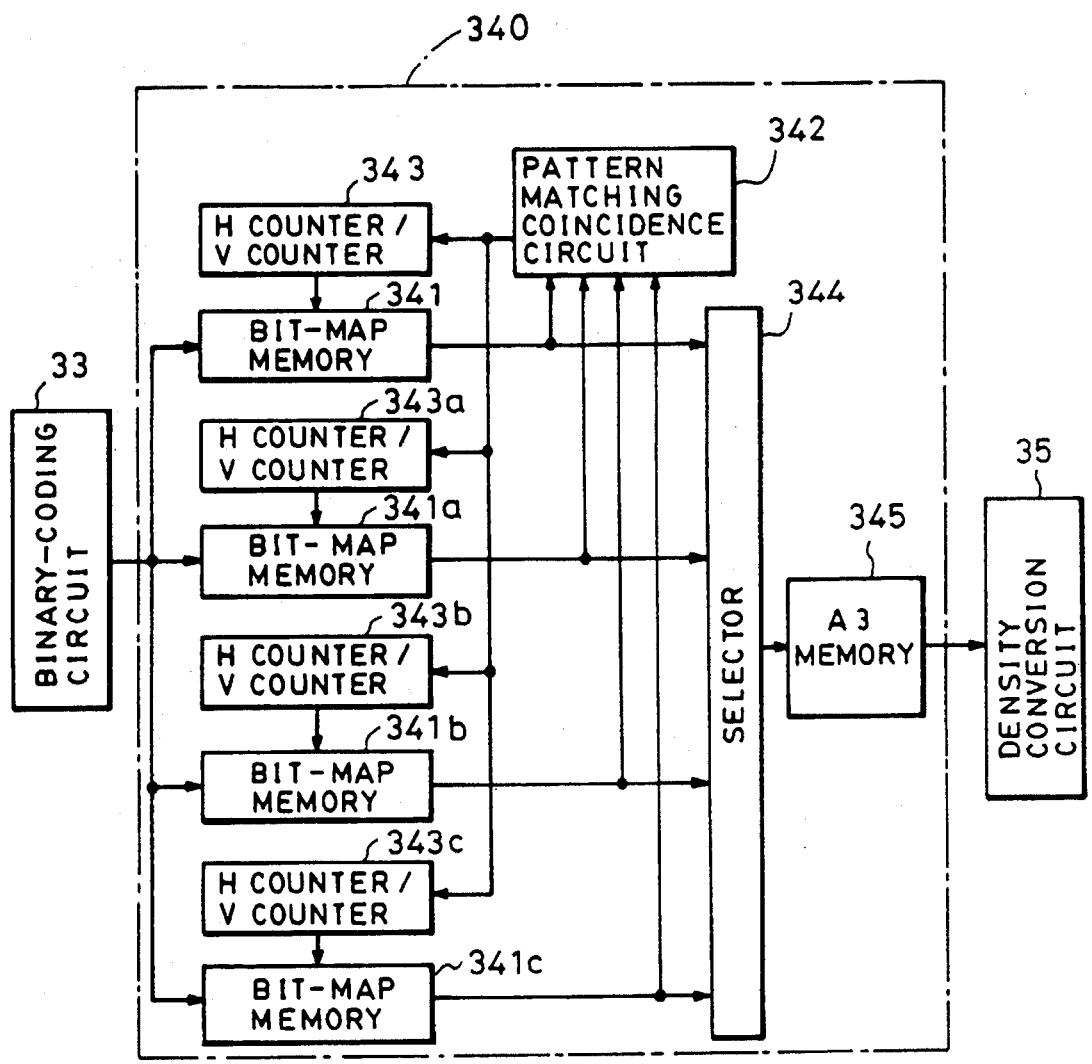
FIG. 4 is a diagram showing the detail of a memory circuit 340 shown in FIG. 3.

FIG. 4 is a diagram showing the detail of the memory circuit 340 in the first embodiment.

The memory circuit 340 comprises bit-map memories 341, 341a, 341b and 341c, a pattern matching coincidence circuit 342, H counters/V counters 343, 343a, 343b and 343c, a selector 344, and an A3 memory 345. The bit-map memories 341, 341a, 341b and 341c separately store four read images when one original image is read in four reading operations in the large-size original mode. The bit-map memory is an example of a storage means for separately storing read images when an original larger than an original which can be read by a reading means in one reading operation is divided and is read a plurality of times by the reading means.

The pattern matching coincidence circuit 342 recognizes an overlapped image area of two read images among four read images stored in the bit-map memories 341, 341a, 341b and 341c. The H counters/V counters 343, 343a, 343b and 343c store addresses (addresses of the bit-map memories 341, 341a, 341b and 341c) indicating a border line between overlapped image areas and non-overlapped image areas recognized by the pattern matching coincidence circuit 342.

The selector 344 selects one of outputs of the bit-map memories 341, 341a, 341b and 341c. The A3 memory 345 synthesizes four read images stored in the bit-map memories 341, 341a, 341b and 341c into one image and stores the synthesized image. The A3 memory 345 can store an image having the size as large as A3-size recording paper. The bit-map memories 341, 341a, 341b and 341c, the pattern matching coincidence circuit 342, the H counters/V counters 343, 343a, 343b and 343c, and the A3 memory 345 constitute an example of an image synthesizing means which synthesizes separately-stored read images into, for example, an image of the above-described original.

The density conversion circuit 35 inverts an image signal received from the binary-coding circuit 33 in the normal copy mode, or an image signal received from the A3 memory 345 in the large-size original mode, and outputs the inverted signal to the image output unit 40.

The image output unit 40 comprises an exposure control unit 41, a photosensitive member 42, developing units 43 and 43a, mounting units 44 and 44a for transfer paper (paper on which an image is transferred), a transfer unit 45, a fixing unit 46, a paper discharge unit 47, and the like. The image output unit 40 converts an image signal received from the image signal control unit 30 into an optical signal, and outputs a read image onto transfer paper. The image output unit 40 is an example of an output means for outputting a synthesized read image.

Next, the operation of the copier of the first embodiment will be explained.

Figure 5:
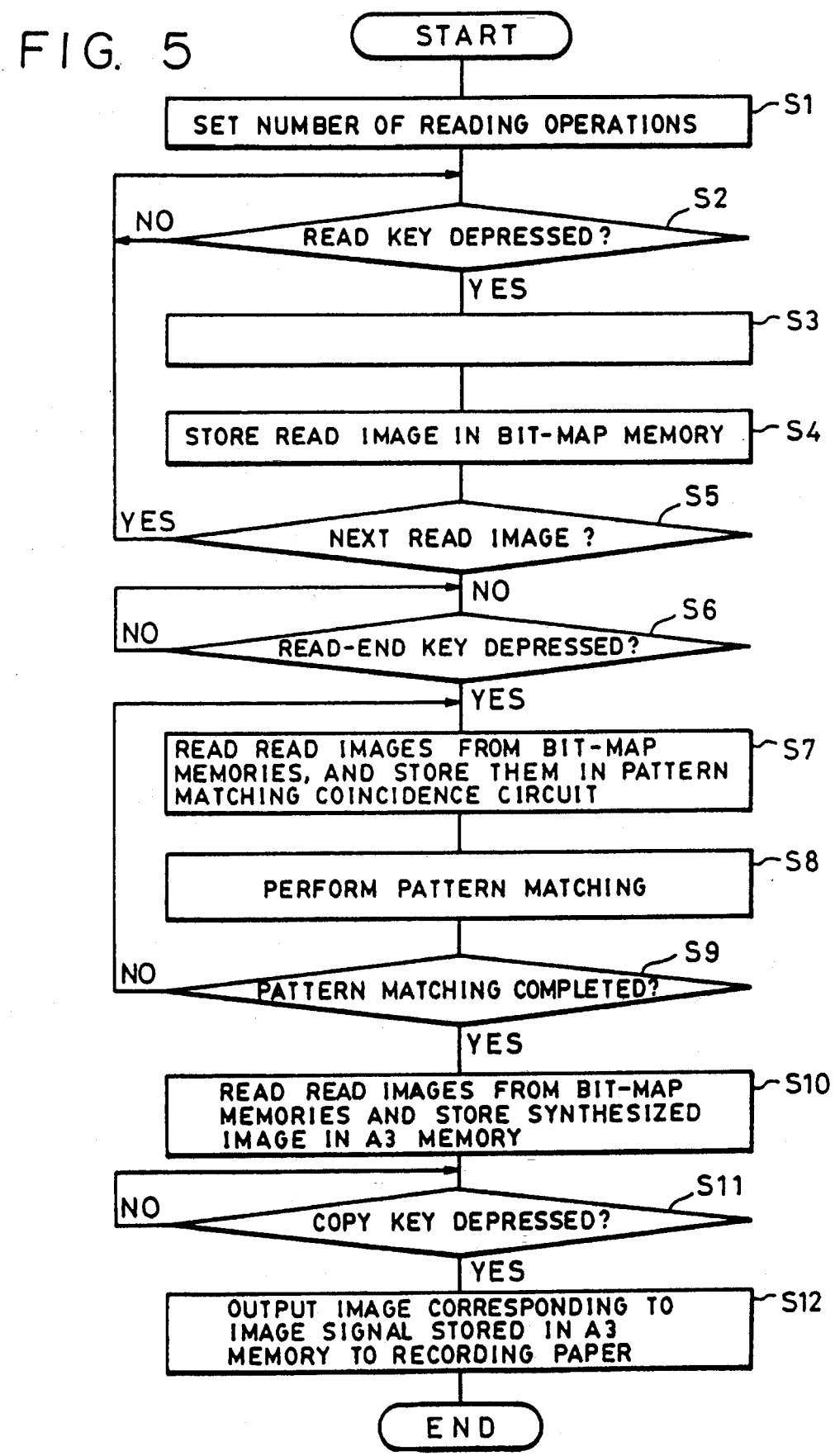
FIG. 5 is a flowchart showing the operation in a large-size original mode in the first embodiment.
Figure 6:
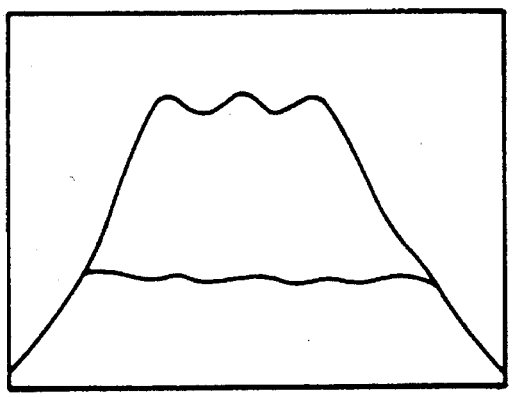
FIGS. 6(1)–6(6) are diagrams showing a specific example of an original image, read images and an output image.
Figure 6:
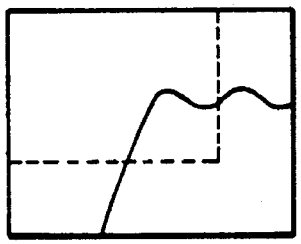
Figure 6:
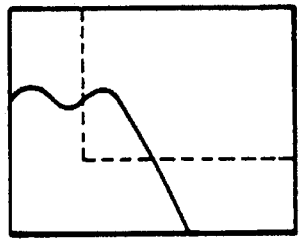
Figure 6:
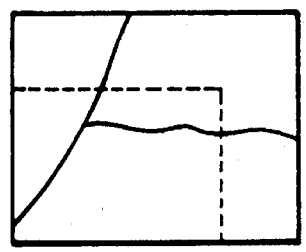
Figure 6:
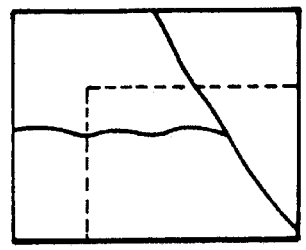
Figure 6:
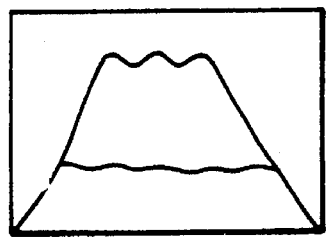

FIG. 5 is a flowchart showing the operation in the large-size original mode in the first embodiment. FIG. 6(1) is a diagram showing an image of an original larger than an original which can be read by the image reading unit 20 in a single reading operation.

In the following explanation, it is assumed that one image original is divided and is read in four reading operations. The operator sets the number "4" of reading operations by a key input from the operation unit 10 (step S1), and sets an image area slightly larger than ¼ of the original on the original mount glass 22. If the CPU 50 determines that the read key has been depressed (step S2), the image area of the original set on the original mount glass 22 is read by the image reading unit 20 (step S3), and the read image is stored in the bit-map memory 341 (step S4). The same processing is performed for the remaining ¾ image areas (steps S2, S3, S4 and S5). At that time, read images of the remaining image areas are stored in the bit-map memories 341a, 341b and 341c. When the operator sets an image area slightly larger than ¼ of the image original on the original mount glass 22, the operator must set the image area so that surrounding portions of the set image area overlap other image areas. FIGS. 6(2), 6(3), 6(4) and 6(5) illustrate a specific example of read images stored in the bit-map memories 341, 341a, 341b and 341c.

When reading operations for all the image areas of the original have been completed, the operator depresses the read-end key. If the CPU 50 determines that the read-end key has been depressed (step S6), the CPU 50 reads read images from the bit-map memories 341 and 341a, and stores the read images in the pattern matching coincidence circuit 342 (step S7).

The pattern matching coincidence circuit 342 recognizes overlapped image areas for the read images stored in the bit-map memories 341 and 341a by a pattern matching method, stores addresses of bit-map memories indicating a border line between the recognized image areas and non-overlapped image areas in the H counters/V counters 343 and 343a, and stores read images for which pattern matching has been completed in the bit-map memories 341 and 341a. Pattern matching is also performed for read images stored in the bit-map memories 341 and 341b, 341 and 341c, 341a and 341b, 341a and 341c, 341b and 341c (step S7, S8 and S9). Broken lines shown in FIGS. 6(2)–6(5) indicate border lines between overlapped image areas and non-overlapped image areas.

After the completion of pattern matching (step S9), the CPU 50 reads read images stored in the bit-map memories 341, 341a, 341b and 341c according to addresses stored in the H counters/V counters 343, 343a, 343b and 343c, and stores the read images in the A3 memory 345 via the selector 344 (step S10). That is, the CPU 50 reduces the four read images, synthesizes the reduced images into one image having the size of A3 recording paper, and stores the synthesized image in the A3 memory 345. When synthesizing the four read images, a synthesizing operation is performed not by superposing broken-line portions of adjacent read images shown in FIGS. 6(2)–6(5), but by superposing end portions of overlapped areas and broken lines corresponding to the end portions. That is, a synthesizing operation is performed by including overlapped areas in a synthesized image.

When outputting a synthesized image, the operator depresses the copy key. If the CPU 50 determines that the copy key has been depressed (step S11), the CPU 50 reads the image stored in the A3 memory 345, inputs the read image in the image output unit 40, and outputs the input image onto recording paper by the image output unit 40 (step S12). FIG. 6(6) is a diagram showing an output image, which is obtained by performing reduced copy of an image original which cannot be read by the image reading unit 20 in a single reading operation.

As described above, one original image is read in four reading operations, the pattern matching coincidence circuit 342 recognizes overlapped image areas for the four read images, and the CPU 50 synthesizes the four read images into one image by reducing the read images in the A3 memory 345 and outputs the synthesized image on recording paper. Hence, it is possible to remove an operation of pasting a plurality of output images by the operator after dividing one original image into a plurality of areas and reading the divided areas.

If the image output unit 40 can output an image on recording paper having the size larger than an image original to be read, four read images may be synthesized without being reduced, and a synthesized image may be output on recording paper having the same size as the image original. In this case, the capacity of the memory 345 may be set in accordance with the size of an output image.

If the original mount is configured as an XY stage for reading large-size originals independently movable in the X and Y directions and having a size such that a large-size original can be set, it is possible to remove trouble of newly setting an original on the original mount every time the original is read by being divided. Particularly, as described above, since connection of divided images is performed by automatic recognition of marker portions, positioning of the XY stage may be rough. Hence, it is possible to obtain an inexpensive and convenient configuration.

Although, in the above-described embodiment, an explanation has been provided of a case wherein one original image is divided and read by the image reading unit 20 in four reading operations, the present invention may also be applied to a case wherein one original image is divided and read by the image reading unit 20 in n reading operations, other than four reading operations. In this case, n bit-map memories and n H counters/ V counters may be provided.

Although, in the above-described embodiment, an explanation has been provided of a case of printing an image on recording paper, a configuration may be adopted wherein an image is output onto a recording medium, such as a magnetic disk or the like, and the recorded image data are stored. When, for example, image data stored on such a recording medium can be printed by another output device, it is possible to output an image on recording paper having the size larger than the maximum original which can be read by a reading unit, the above-described connection of divided images may be performed without reducing the size of images so that an image having the same size as that of the read original is obtained. The capacity of the memory 345 may be set in accordance with the size of an output image.

Figure 10:
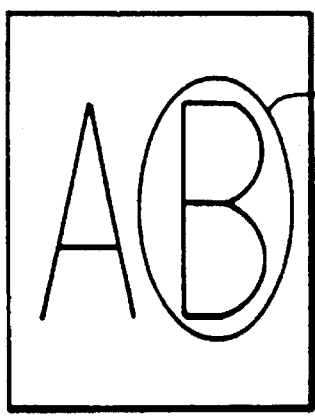
FIGS. 10(1)–10(5) are diagrams showing a specific example of original images, read images and a synthesized image processed in the second embodiment.
Figure 10:
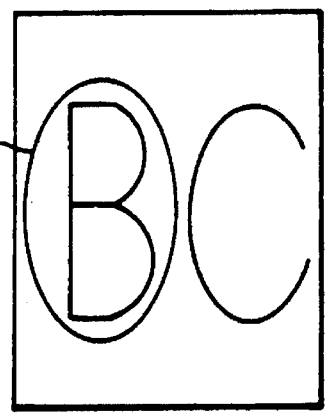
Figure 10:
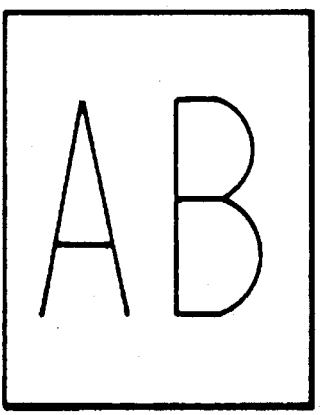
Figure 10:
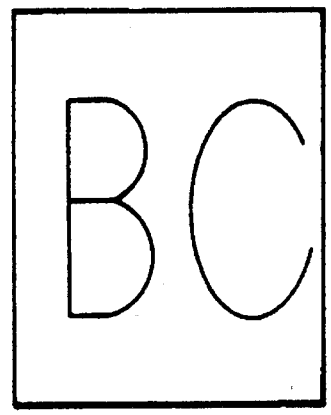
Figure 10:
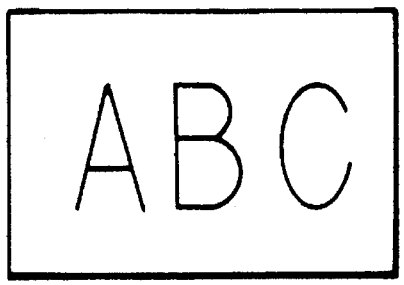

An explanation will now be provided of the method and configuration of a second embodiment of the present invention. As shown in FIGS. 10(1)–10(5), color marker portions M1 and M2 are provided in a plurality of originals, and each of the original is read. Subsequently, by connecting images included in the color marker portions M1 and M2 of respective read images by pattern matching, and recognizing the positions of the images, the respective read images are electrically connected to synthesize them into one image, and the synthesized image is output.

Figure 7:
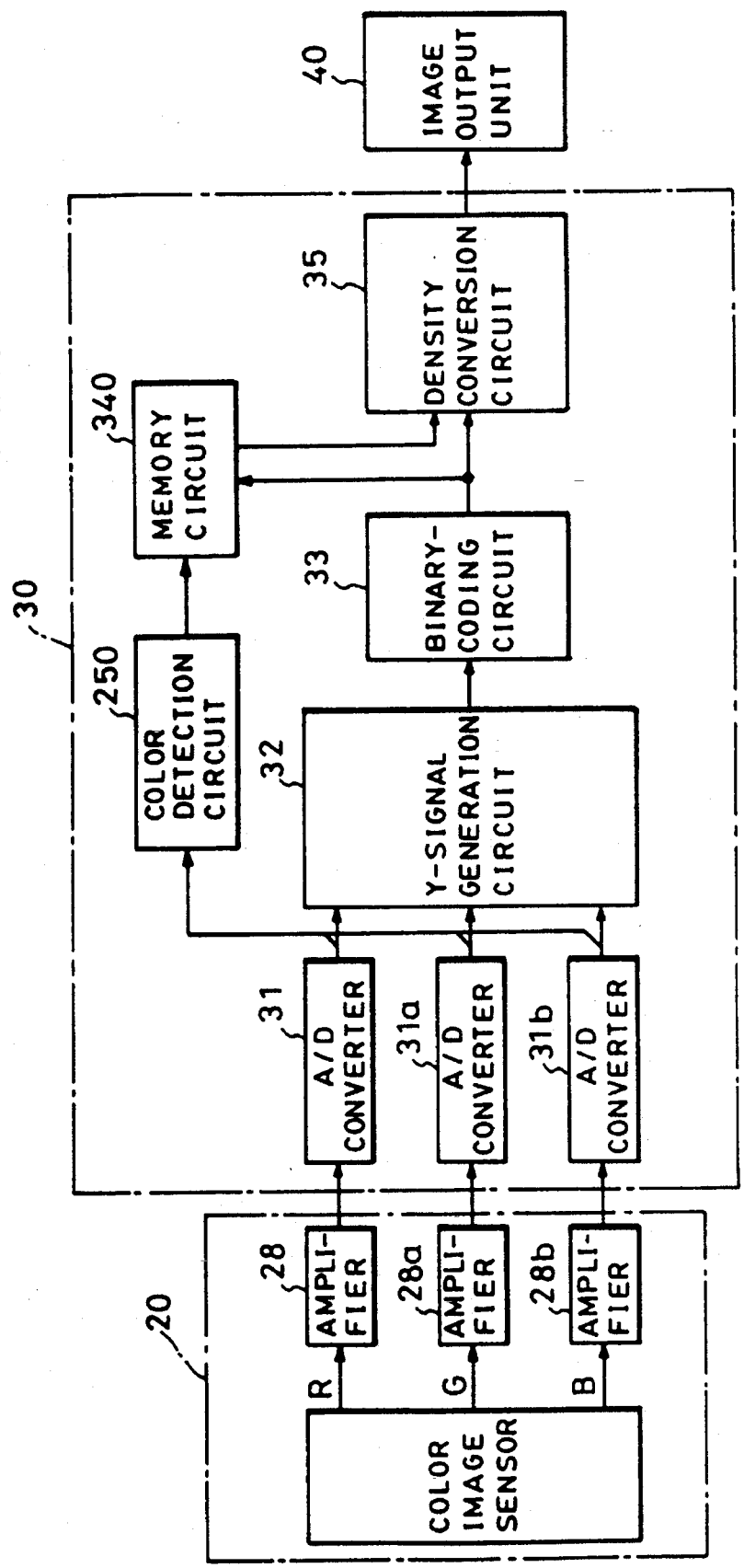
FIG. 7 is a block diagram showing the detail of the image reading unit 20 and the image signal control unit 30 according to a second embodiment of the present invention.

FIG. 7 is a block diagram showing the configuration of the image reading unit 20 and the image signal control unit 30 shown in FIG. 1 in the present embodiment.

A color detection circuit 250 detects the color of an input image by inputting output signals from the A/D converters 31, 31a and 31b and comparing level ratios of the respective signals with a preset color recognition table, and recognizes a marker portion by this color information. A color maker itself included in the marker portion and an ordinary image portion (for example, a black letter or the like) are separated by the color detection circuit 250 and are stored in a memory circuit 340. Other blocks are the same as those in FIG. 3.

Figure 8:
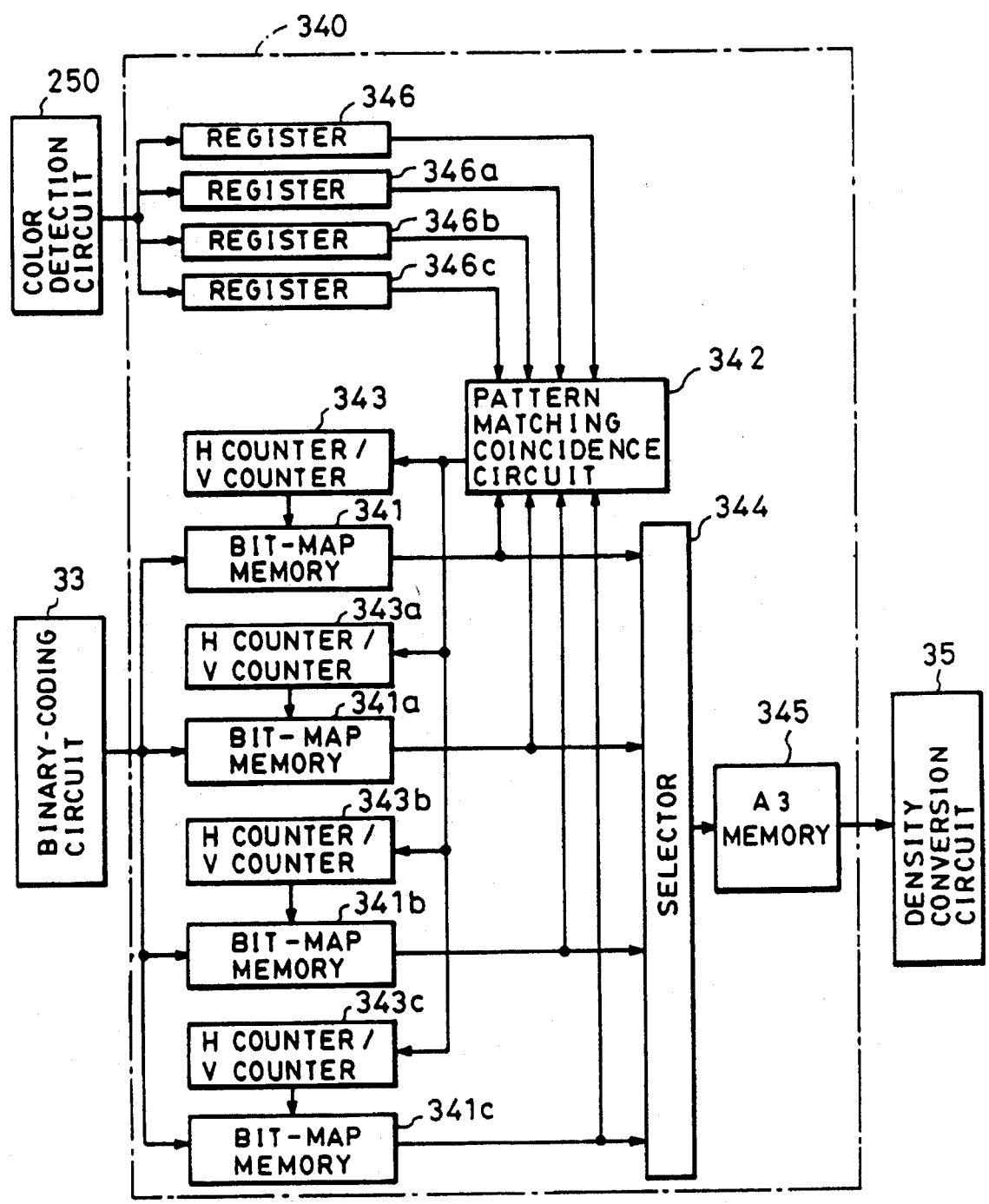
FIG. 8 is a block diagram showing the detail of the memory circuit 340 in the second embodiment.

FIG. 8 is a diagram showing the detail of the memory circuit 340.

The memory circuit 340 comprises bit-map memories 341, 341a, 341b, . . . , 341n and a pattern matching coincidence circuit 342 , H conunters/V counters 343, 343a, 343b, . . . , 343n, a selector 344, an A3 memory 345, and color marker registers 346, 346a, 346b, . . . , 346n.

The bit-map memories 341, 341a, 341b,. . . , 341n individually store four read images when one original is read in four reading operations in the original-synthesizing mode.

The color marker registers 346, 346a, 346b, . . . , 346n store data of coordinates of both ends and data of angles of color markers detected by the color detection circuit 250

A pattern matching coincidence circuit 342 recognizes overlapped color marker portions for two read images among a plurality of read images stored in the bit-map memories 341, 341a, 341b, . . . , 341n according to data of the color marker registers 346, 346a, 346b, . . . , 346n by a pattern matching method.

The H counters/V counters 343, 343a, 343b, . . . , 343n store addresses (addresses of the bit-map memories 341, 341a, 341b, . . . , 341n) of color marker portions recognized by the pattern matching circuit 342.

The selector 344 selects one of outputs of the bit-map memories 341, 341a, 341b, . . . , 341n.

The A3 memory 345 synthesizes a plurality of read images stored in the bit-map memories 341, 341a, 341b, . . . , 341n into one image, and stores the synthesized image The maximum size which can be stored in A3 memory 345 is the size of A3 recording paper.

The color marker registers 346, 346a, 346b, . . . , 346n, the bit-map memories 341, 341a, 341b, . . . , 341n, the pattern matching coincidence circuit 342, the H counters/V counters 343, 343a, 343b, . . . , 343n and the A3 memory 345 constitute an image synthesizing means for synthesizing separately-stored read images into one image.

Figure 9:
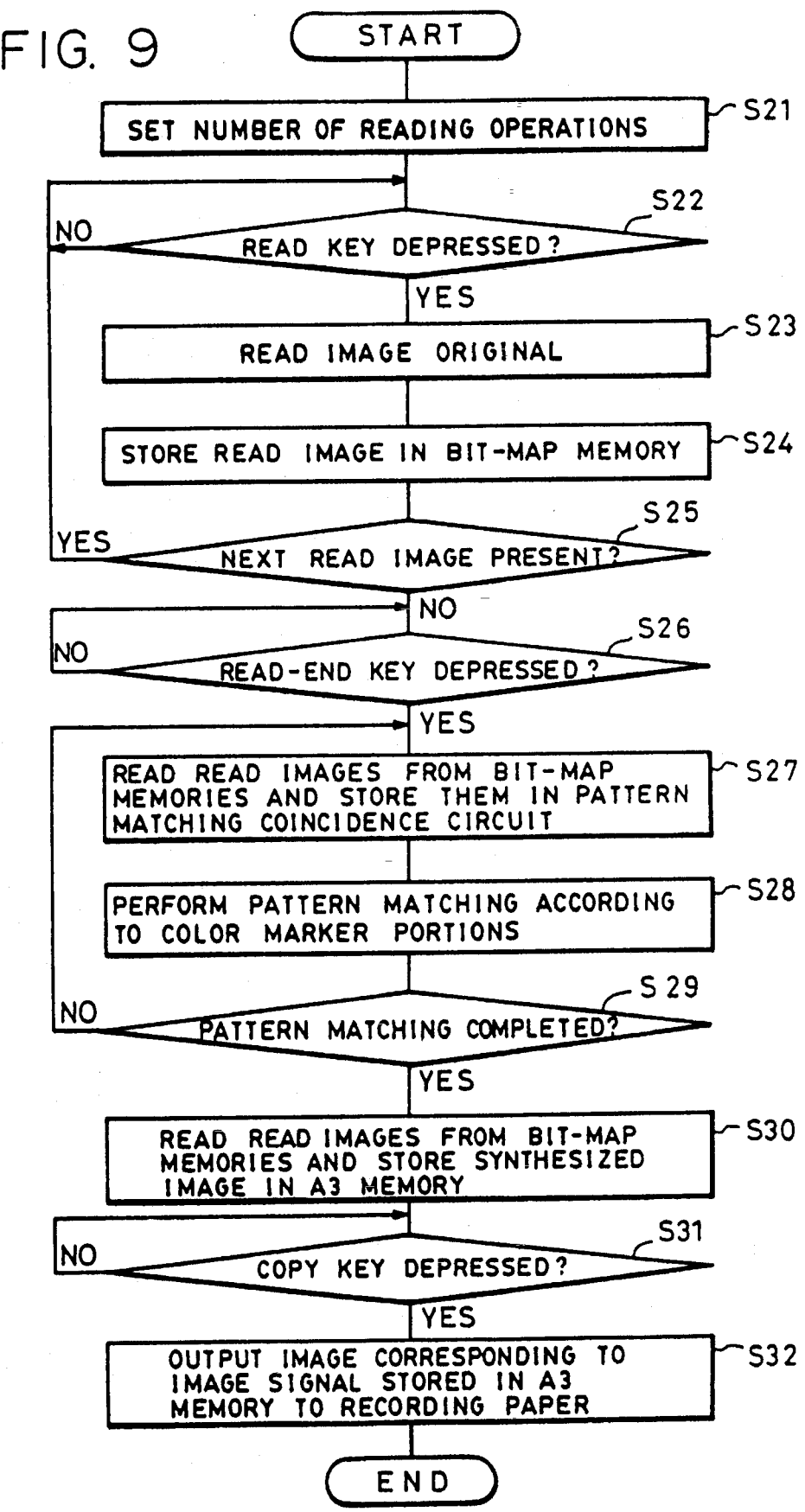
FIG. 9 is a flowchart showing the operation in an original-synthesizing mode in the second embodiment.

FIG. 9 is a flowchart showing the operation of reading two originals each provided with color portions M1 and M2 as shown in FIGS. 10(1) and 10(2), synthesizing read images into one image, and outputting the synthesized image.

First, the operator sets an original-synthesizing mode of connecting two originals so as to synthesize two images into one image by a mode set key on the operation unit 10 (step S21) The first original provided with the marker portion M1 is set on the original mount glass 22, and the read key is depressed.

When the CPU 50 detects the depression of the read key (step S22), an image of the original set on the original mount glass 22 is read by the image reading unit 20 (step S23), and the read image is stored in the bit-map memory 341. At the same time, the coordinates and the like of the color marker are stored in the color marker register 346 (step S24). The same reading operation is performed for the second original provided with the marker portion M2 (step S22).

When all the originals have been read (step S25, the operator depresses the read-end key. If the CPU 50 thereby determines the end of the reading operation (step S26), image data are read from the bit-map memories 341 and 341a, and the read data are stored in the pattern matching coincidence circuit 342 (step S27)

Data of color markers corresponding to respective images are read by the color marker registers 346 and 346a, and pattern matching is performed for an overlapped portion of images included in respective markers. Exact synthesizing positions of respective read images are determined by such pattern matching, and addresses of bit-map memories for correcting read positions of respective read images are stored in the H counters/V counters 343 and 343a (step S28).

Since two originals are read in the example shown in FIGS. 10(1) and 10(2), the process then proceeds to the next step. However, if three or more originals are read, the same processing is performed for combinations of other bit-map memories. When all of the above-described processing has been terminated (step S29), read images stored in the bit-map memories are sequentially read according to addresses stored in respective H counters/V counters, and are stored in the A3 memory 345 via the selector 344 (step S30). At that time, the coordinates and angles of the respective read images are adjusted according to data of the respective H counters/V counters 343, 343a, 343b, and 343c, necessary magnification-varying processing is performed, and read images are connected to one image having the size of A3 recording paper. After the completion of the connection, processing of erasing color markers is performed, and a storing operation in the A3 memory 345 is performed.

For outputting the synthesized image, the operator depresses the copy key. If the CPU 50 determines the depression of the copy key (step S31), the image stored in the A3 memory 345 is read, and is input to the image output unit 40, which outputs the image on recording paper (step S32). FIG. 10(5) is a diagram showing a specific example of an output image.

As described above, according to the second embodiment, it is possible to exactly connect color marker portions of a plurality of read images by performing pattern matching and magnification-varying processing, and thereby to remove a manual pasting operation.

Although, in the second embodiment, an explanation has been provided of a case of printing an image on recording paper, a configuration may be adopted wherein an image is output onto a recording medium, such as a magnetic disk or the like, and the recorded image is stored.

In the second embodiment, since respective read images are synthesized by automatically performing rotation and magnification-varying processing, the sequence of reading respective originals may be arbitrary, and the direction of each original is not necessarily the same. Hence, it is possible to configure the system such that a plurality of originals to be connected are set in an automatic original feeding apparatus, a reading operation is performed by an automatic feeding mechanism, the completion of the reading operation is automatically detected by an original detection sensor of the feeding apparatus, and the process then proceeds to the above-described pattern matching processing, and thereby to simplify the operation. Particularly, as described above, since images included in marker portions are connected by performing automatic recognition and correcting the angles, sizes and the like of the images, the setting of originals may be rough. Hence, it is unnecessary to provide a high-precision feeding apparatus, and it is therefore possible to provide an inexpensive apparatus.

In the second embodiment, pattern matching processing of superposing images included in marker portions is performed. However, for example, as shown in FIGS. 11(1)–11(3), pattern matching processing may be performed so as to connect line-segment images included in respective marker portions M3 and M4, whereby respective read images may be connected.

As described above, by performing automatic recognition of images included in marker portions provided in a plurality of originals, it is possible to connect respective read images, and synthesize the read images into one image with exactly positioning the plurality of originals. It is thereby possible to reduce burden on the operator.

An explanation will now be provided of a third embodiment of the present invention. In the method of the third embodiment, a large-size original, in which color markers are previously provided on areas to be divided, is divided, and divided images are read and synthesized so that the color markers in the read images are superposed on one another. A copier of the third embodiment is the same as the copier described with reference to FIGS. 1, 2, 7 and 8. Only the method of synthesis differs.

In the present embodiment, it is assumed that one original is read by dividing it into four portions. As shown in FIG. 12(1), color marker lines M5 and M6 are provided at border portions of respective divided portions of the original.

First, the operator sets the number "4" of reading operations by a key input from the operation unit 10 (step S21), and sets an image area slightly larger than ¼ of the image original on the original mount glass 22. That is, since respective divided images are synthesized by the above-described pattern matching after reading images, the images are stored so that parts of the respective divided images are superposed on one another in a state of including the color marker lines M5 and M6. FIGS. 12(2)–12(5) are schematic diagrams showing a specific example of divided images.

If the CPU 50 determines that the read key has been depressed (step S22), the image area of the original set on the original mount glass 22 is read by the image reading unit 20 (step S23), and the read image is stored in the bit-map memory 341. At the same time, the coordinates and the like of the above-described color marker are stored in the color marker register 346 (step S24). The same processing is performed for the remaining ¾ image areas (steps S22–S24).

When reading operations for all the image areas of the image original have been completed (step S25), the operator depresses the read-end key. If the CPU 50 determines that the read-end key has been depressed (step S26), the CPU 50 reads read image data from the bit-map memories 341 and 341a, and stores the read image data in the pattern matching coincidence circuit 342 (step S27).

Subsequently, data of color markers corresponding to the respective images are read from the color marker registers 346 and 346a, and pattern matching is performed from overlapped marker portions using the data. According to such pattern matching, addresses of the bit-map memories for border lines (that is, the marker lines M5 and M6) of four divided images which are exact with respect to vertical and horizontal positions and angles are stored in the H counters/V counters 343 and 343a (step S28). In this case, the values of the addresses are set by appropriately correcting the values so that the respective divided images are properly stored in the A3 memory 345.

Such processing is performed for respective read images stored in the memories 341 and 341b, 341 and 341c, 341a and 341b, 341a and 341c, and 341b and 341c. After the completion of all such pattern matching processing (step S29), read images stored in the bit-map memories 341, 341a, 341b and 341c are read according to addresses stored in the respective H counters/V counters 343, 343a, 343b and 343c, and the read images are stored in the A3 memory 345 via the selector 344 (step S30). At that time, the coordinates and angles of the respective divided images are adjusted according to data of the H counters/V counters 343, 343a, 343b and 343c, necessary magnification varying processing is performed, and the divided images are connected as one image having the size of A3 recording paper.

After the completion of the connection, processing of erasing color markers is performed, and a storing operation in the A3 memory 345 is completed.

For outputting the synthesized image, the operator depresses the copy key. If the CPU 50 determines the depression of the copy key (step S31), the image stored in the A3 memory 345 is read, the read image is input to the image output unit 50 which outputs the image on recording paper (step S32). FIG. 12(6) is a diagram showing a specific example of the output image, which is a reduced image of the image of the original shown in FIG. 12(1).

As described above, in the present embodiment, it is possible to read an original having a size which cannot be read by the image reading unit 20 by dividing the image, and to connected respective divided images by performing pattern matching of color marker portions of respective divided images. Hence, it is possible to remove a manual pasting operation when a large-size original is output by reducing the size.

Alternatively, as shown in FIG. 13(1), a color marker line M7 having the shape of a closed loop may be provided over respective divided portions of the original, the color marker line M7 may be divided in a state of having certain overlapped portions, the divided images may be stored so that parts of the images overlap, and the respective divided images may be synthesized by pattern matching after reading the images.

An explanation will now be provided of a fourth embodiment of the present invention.

Figure 14:
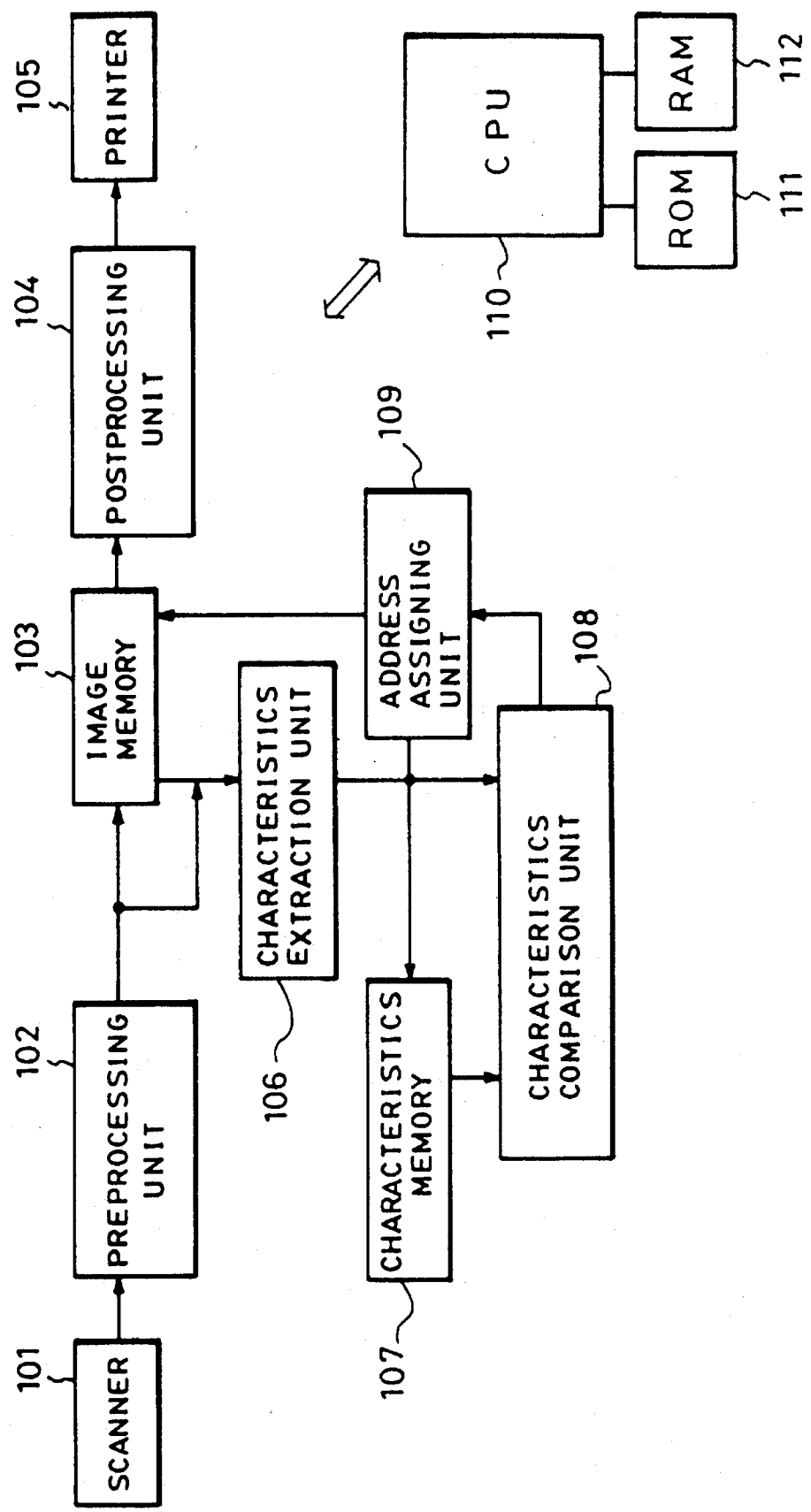
FIG. 14 is a block diagram showing the configuration of an image processing apparatus according to a fourth embodiment of the present invention.

FIG. 14 is a block diagram showing the configuration of an image processing apparatus of the fourth embodiment. Blocks shown in FIG. 14 may be applied to electronic apparatuses, such as image copying apparatuses and the like, wherein an original is read using a CCD, A/D converters or the like, obtained digitized image data are stored in image memories, the stored data are processed, the processed data are output to one of various kinds of printers, and thus an image is obtained.

In FIG. 14, a scanner 101 reads an image of an original and inputs image data obtained by digitizing read image data. A preprocessing unit 102 performs a series of processing, such as providing density data by performing black-level correction, white-level correction and logarithmic transformation. An image memory 103 temporarily stores image data processed by the preprocessing unit 102. A postprocessing unit 104 performs image processing, such as area assignment, enlargement, reduction, density adjustment and the like, for image data transmitted from the image memory 103. A printer 105 prints an image according to image data processed by the postprocessing unit 104 on a recording medium, such as recording paper or the like. A characteristics extraction unit 106 extracts edges as characteristics by differentiating image data. A characteristics memory 107 stores characteristics data extracted by the characteristics extraction unit 106. A characteristics comparison unit 108 compares a plurality of characteristics data. An address assigning unit 109 assigns addresses of the image memory 103 according to results obtained by the characteritics comparison unit 108. A CPU 110 controls the entire apparatus by programs. A ROM 111 stores programs corresponding to flowcharts, and the like. A RAM 112 is used as work areas for various kinds of programs.

An electronic apparatus having the above-described configuration can be applied even if the size of an original exceeds the size of an image which can be read by the scanner 101. The operation of such an apparatus will now be explained.

Figure 16A:
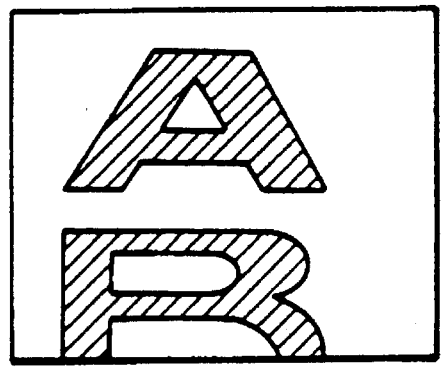
FIGS. 16(a)–16(c) are diagrams illustrating an image processing procedure in the fourth embodiment.
Figure 16B:
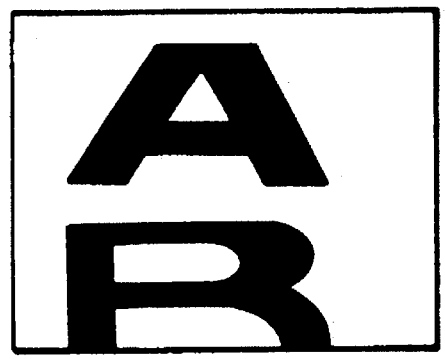
Figure 16C:
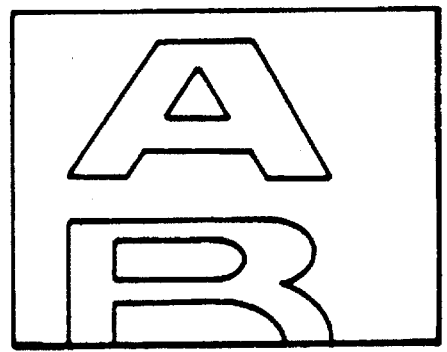
Figure 17A:
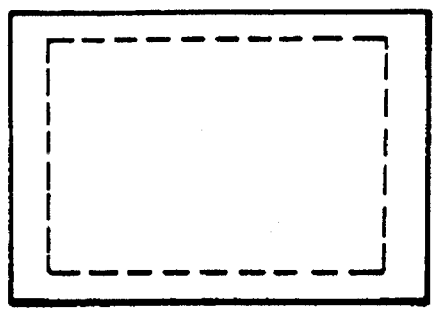
FIGS. 17(a)–17(d) are diagrams illustrating an image processing procedure in the fourth embodiment.
Figure 17B:
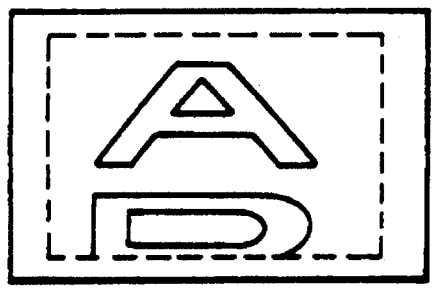
Figure 17C:
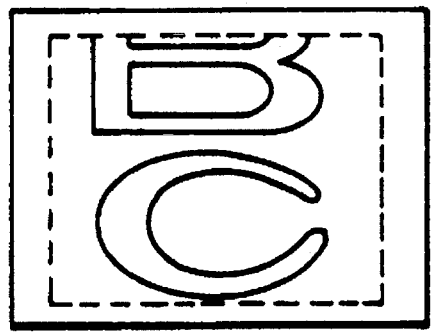
Figure 17D:
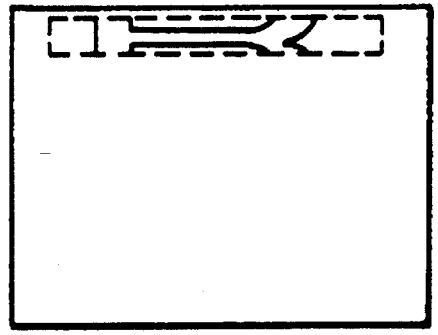
Figure 18:
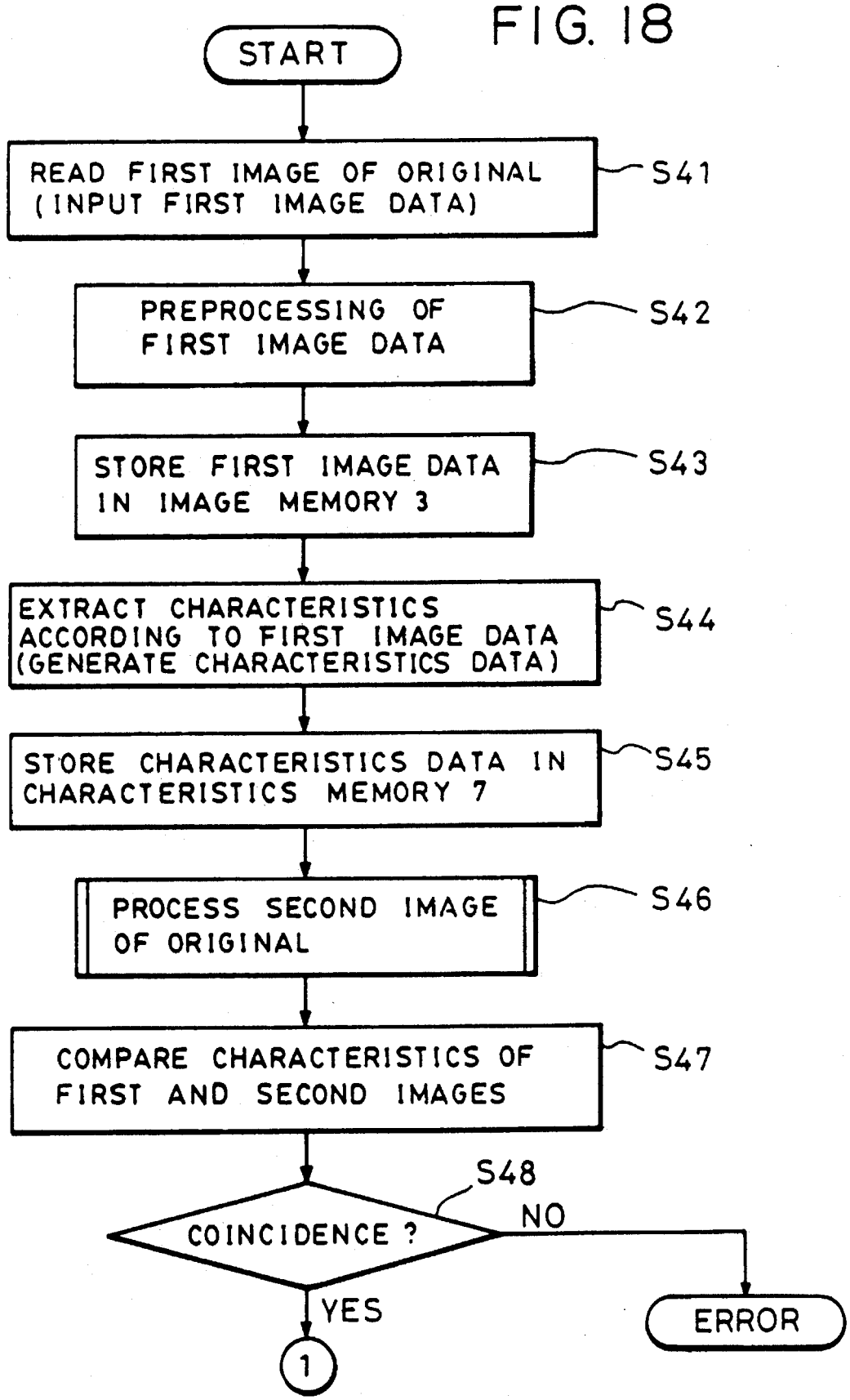
FIG. 18 is a flowchart illustrating an image processing procedure in the fourth embodiment.
Figure 19:
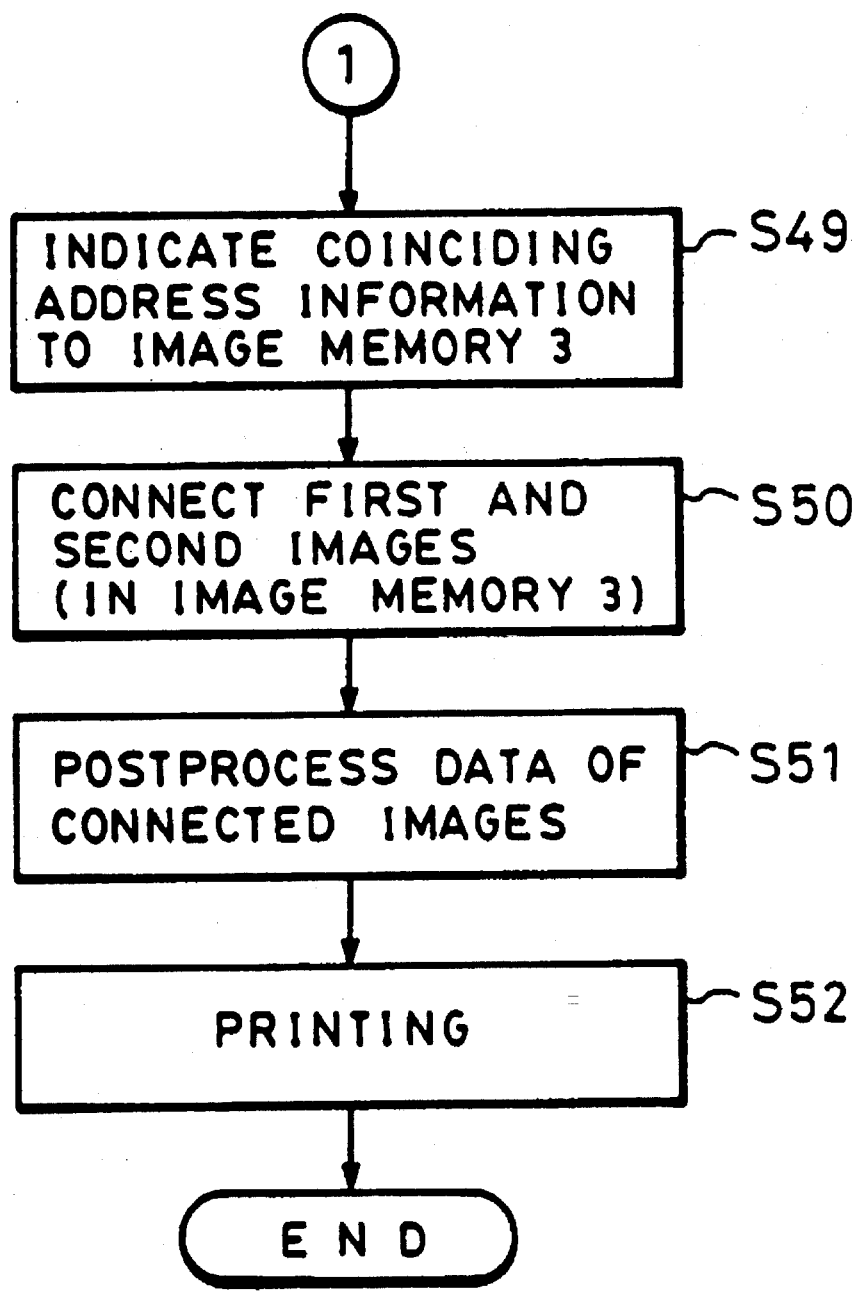
FIG. 19 is a flowchart illustrating an image processing procedure in the fourth embodiment.

FIGS. 15(a)–17(d) are diagrams illustrating image processing procedures in the present embodiment. FIGS. 18 and 19 are flowcharts illustrating image processing procedures in the present embodiment. In the flowcharts shown in FIGS. 18 and 19, the CPU 110 controls the entire system, and each processing is performed in each unit.

In practice, when an image of an original having a size (I) exceeding the maximum size (S) which can be read by the scanner 101 in one reading operation is read, and the read image is printed, the number (N) of operations (One operation comprises setting of the original on the scanner 101 and instruction of start of reading by the scanner 101) by the operator in the apparatus has a relationship (N>I÷S). In the following explanation, a case is shown wherein N is fixed to 2.

First, a partial image (hereinafter termed a "first image) of the original is read by the scanner 101 in a first operation by the operator and is converted into digital data (first image data) (step S41). The digitized first image data are subjected to a series of processing, such as providing density data by performing black level correction, white level correction and logarithmic transformation, in the preprocessing unit 102 (step S42). The preprocessed first image data are first stored in the image memory 103 (step S43). Subsequently, first characteristics data in an easily-comparable form are generated according to the first image data stored in the image memory 103 by the characteristics extraction unit 106 (step S44), and are stored in the characteristics memory 107 (step S45).

In order to process a second image which is an unread portion of the original, the position of the original set in the scanner 101 is moved (shifted), and the same processing as for the first image is performed for the second image. That is, digitized second image data are output from the scanner 101, and are stored in the image memory 103 via the preprocessing unit 102. The characteristics extraction unit 106 generates second characteristics data from the second image data stored in the image memory 103 (step S46).

Subsequently, the characteristics comparison unit 108 finds out a point where images coincide according to the first and second characteristics data stored in the characteristics memory 7, and outputs the obtained result to the address assigning unit 109 (steps S47, S48 and S49). If a point where image coincide is absent, processing is terminated assuming an error. Processing of reading again the second image without terminating processing assuming an error may, of course, be performed, and determination of an error may be performed after the repeated reading processing.

Figure 15A:
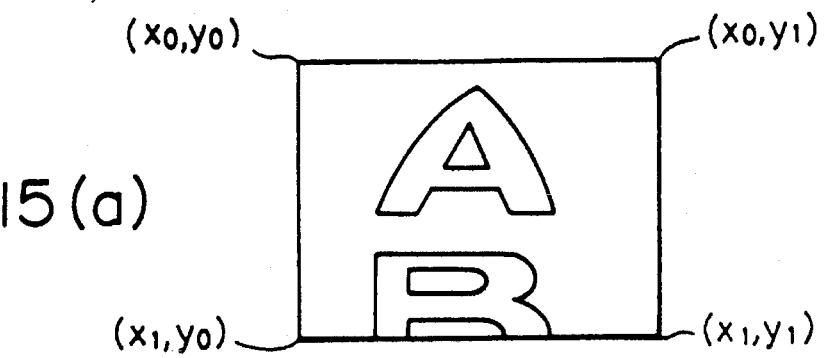
FIGS. 15(*a*)–15(*c*) are diagrams illustrating an image processing procedure in the fourth embodiment.
Figure 15B:
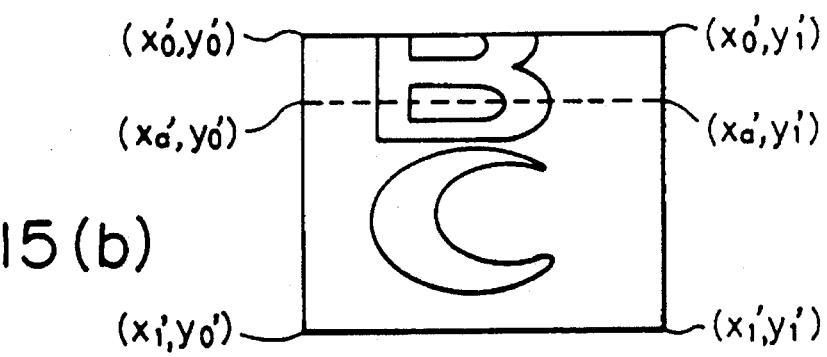
Figure 15C:
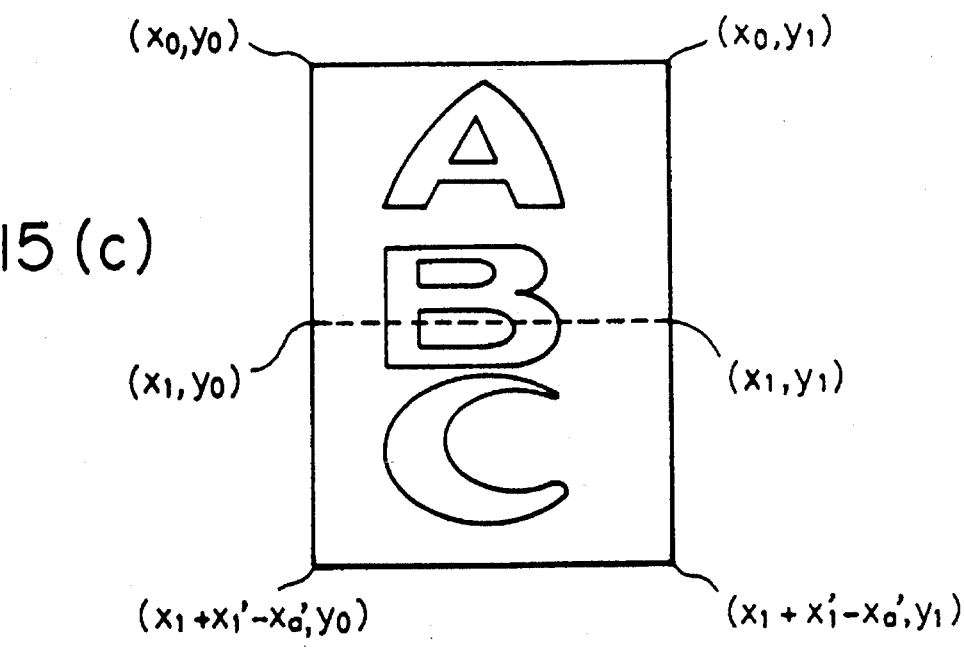

The address assigning unit 109 assigns the addresses of connecting portions for transmitting the first and second image data stored in the image memory 103 as a single connected image to the postprocessing unit 104 in the following stage. For example, as shown in FIGS. 15(a) and 15(b), suppose that the coordinates of four points of the first image stored in the image memory 103 are $(x_0, y_0)$, $(x_0, y_1)$, $(x_1, y_0)$ and $(x_1, y_1)$, and the coordinates of four points of the second image are $(x_0', y_0')$, $(x_0', y_1')$, $(x_1', y_0')$ and $(x_1', y_1')$. In the second image, it is assumed that an image present in a range from line $(x_a', y_0')$–$(x_a', y_1')$ to line $(x_1', y_0')$–$(x_1', y_1')$ in the subscanning direction (the vertical direction in FIG. 15(b)) is an effective second image. For the purpose of connection, the coordinates of this effective second image are changed from four points $(x_0', y_0')$, $(x_0', y_1')$, $(x_1', y_0')$ and $(x_1', y_1')$ to four points $(x_1, y_0)$, $(x_1, y_1)$, $(x_1+x_1'-x_a', y_0)$ and $(x_1+x_1'-x_a', y_1)$. As a result, the first image shown in FIG. 15(a) and the second image shown in FIG. 15(b) are connected as one image, and a connected image shown in FIG. 15(c) is formed in the image memory 103 by assignment of the address assiging unit 109 (step S50).

As described above, image data connected to one surface are subjected to image processing, such as area assignment, enlargement, reduction, density adjustment and the like, by the postprocessing unit 104, and are output to the printer 105, which prints an image (steps S51 and S52).

An explanation will now be provided of processing from extraction of characteristics to connection of images. As for extraction of characteristics, as shown in FIGS. 16(a)–16(c), in the present embodiment, an image 16(c) obtained by performing a binary-coding operation of image data (a) stored in the image memory 103 (FIG. 16(b)), and performing differentiating processing and edge extraction is provided as characteristic data.

As for comparison of characteristics, a time is needed for performing comparison over the entire region of the image, comparison is performed in a short time in the following manner. First, if it is assumed that a range which can be actually read by the scanner 101 is a portion inside broken lines shown in FIG. 17(a), first characterstics data are as shown in FIG. 17(b). Second characterstics data are as shown in FIG. 17(c). As shown in FIG. 17(d), the characteristics comparison unit 108 extracts characterstics data of the second characteristics data (second characteristics data for comparison) present in a predetermined short range from an edge of the frame where data are present in the above-described image reading range for the purpose of comparison. The characteristics comparison unit 108 compares an frame edge portion of the first characteristics data where data are present in the above-described image reading range, that is, the lower portion of the broken lines shown in FIG. 17(b) with the above-described second characteristics data (FIG. 17(d)) by a pattern matching method, and the coordinates of a coinciding portion of the first characteristics data are transmitted to the address assigning unit 109. When image data stored in the image memory 103 are transmitted to the postprocessing unit 104 for performing image processing, the address assigning unit 109 can handle two images as one connected image by transmitting read addresses in the sequence of $(x_0, y_0), \ldots, (x_0, y_1), \ldots, (x_0, y_0), \ldots, (x_1, y_1), (x_a', y_0'), \ldots, (x_a, y_1'), \ldots, (x_1', y_0'), \ldots, (x_1', y_1')$ in the case of FIGS. 15(a) and 15(b).

As explained above, according to the present embodiment, it is possible to handle images read in a plurality of reading operations as one large image.

A fifth embodiment of the present invention will now be explained.

Figure 20:
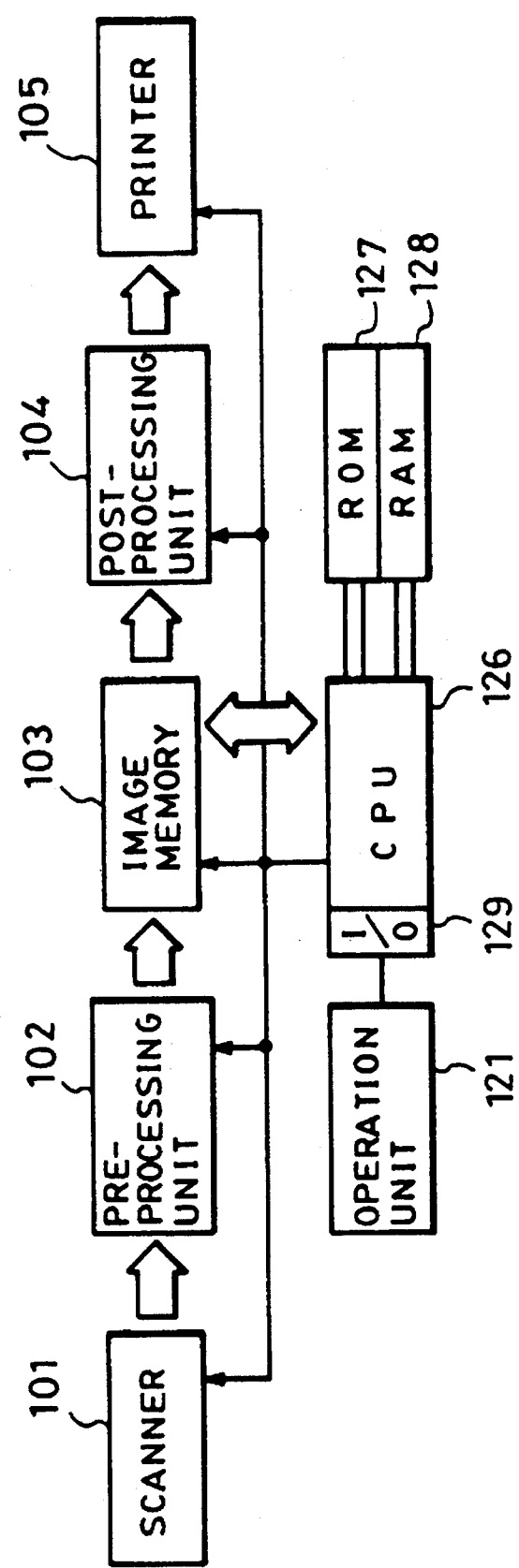
FIG. 20 is a block diagram showing the configuration of an image processing apparatus according to a fifth embodiment of the present invention.

FIG. 20 is a block diagram showing the configuration of an image processing apparatus of the fifth embodiment. In FIG. 20, units having the same configurations and functions as units shown in FIG. 14 are indicated by the same reference numerals, and explanation thereof will be omitted. In FIG. 20, an operation unit 121 includes keys for performing input of various kinds of commands, data input and the like, and a display unit. A CPU 126 controls the characteristics extraction unit 106, the characteristics memory 107, the characteristics comparison unit 108, and the address assigning unit 109 as configured in the fourth embodiment by software, and controls the entire apparatus. There is also shown an I/O 129 for the CPU 126 and an operation unit 121. A ROM 127 stores programs for operating the CPU 126, and the like A RAM 128 is used as work areas for various kinds of programs.

The operation of the present embodiment will now be explained.

As in the fourth embodiment, the scanner 101 comprising a CCD sensor, an A/D converter and the like inputs digitized image data to the preprocessing unit 102. Image data subjected to black correction, white correction and logarithmic transformation are stored in an image memory 103. The CPU 126 performs binary-coding of image data stored in the image memory 103, and stores differentiated characteristic data in a certain area in the RAM 128. After repeating the abovedescribed processing a plurality of times, the CPU 126 compares characteristics data stored in the RAM 128 by a pattern matching method, and outputs data to the postprocessing unit 104 for performing image processing so as to provide one connected image using the coordinates of a coinciding portion stored in the RAM 128. Even if such processing from extraction of characteristics to connection of images is performed by the CPU 126, the ROM 127 and the RAM 128, the same effect as in the fourth embodidment can be obtained.

A sixth embodiment of the present invention will now be explained.

Although, in the above-described fourth and fifth embodiments, the postprocessing unit 104 has the functions of area assignment, enlargement and reduction of image data, the present invention is not limited to this configuration. The preprocessing unit 102 may, for example, have the above-described functions. An explanation will now be provided illustrating the reduction function.

FIG. 21 is a diagram illustrating an image processing procedure in the sixth embodiment.

Figure 21A:
FIGS. 21(a)–21(e) are diagrams illustrating an image processing procedure in a sixth embodiment of the present invention.
Figure 21B:
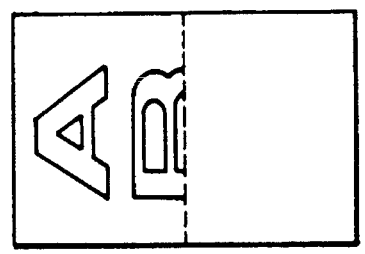
Figure 21C:
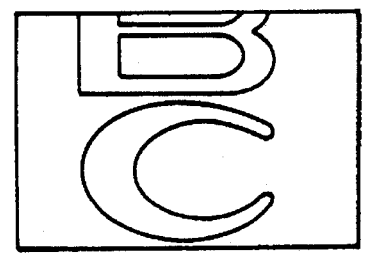
Figure 21D:
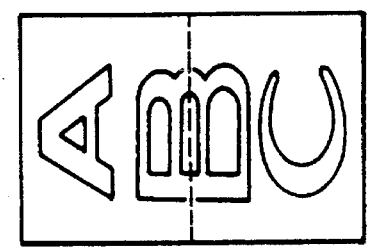
Figure 21E:
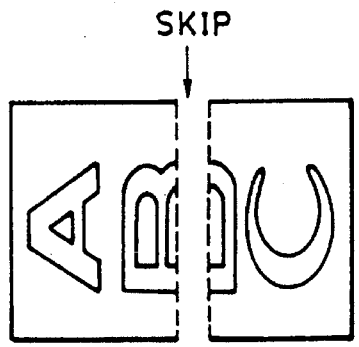

Image data (a first image) shown in FIG. 21(a) are in put from the scanner 101, are reduced after being subjected to black correction, white correction and logarithmic conversion by the preprocessing unit 102 and the reduced image data are stored in the image memory 103 in the form shown in FIG. 21(b). In the second reading operation of a second image, as shown in FIG. 21(c), image data are stored in the image memory 103 in the form shown at the right of FIG. 21(d) after passing through the preprocessing unit 102. A point where images coincide is determined by extraction and comparison of characteristics and comparison in the same manner as in the fifth embodiment. The CPU 128 outputs image data shown in FIG. 21(e) to the postprocessing unit 104.

As described above, the present embodiment has the advantage that the capacity of the image memory 103 may cover only the size of an image which can be output by the printer 105.

Although, in the above-described fourth to sixth embodiments, an explanation has been provided of processing of obtaining one image by connecting two images, i.e., a first image and a second image, the present invention is not limited to such processing. For example, an operation unit may be provided, and the number of image inputs by the scanner 101 may be set from the operation unit, characteristics data extracted from respective image data of the set numbers may be generated, and a plurality of images may be connected. If three or more images are connected, efficiency of processing can be increased by arranging so that consecutive images are connected in the order of image inputs.

In the above-described embodiments, processing of color reproduction when R, G and B luminance data are input has been illustrated. However, even if any of data forms of other color systems, such as L*, a*, and b*, L*, u* and v*, YIQ, or the like, is input, only the method of color reproducing processing is changed. Hence, the present invention may also be applied to such data forms.

Although, in the above-described embodiments, only color printing of characters has been illustrated, the present invention may also be applied to color printing of drawings, raster images and the like.

Furthermore, in place of a color laser-beam printer, a color dot printer, a color ink-jet printer, a color thermal transfer printer, a bubble-jet printer or the like may be also used as the output printer.

In addition, the output printer is not limited to a binary-output printer, but a multivalue-output printer may, of course, be used.

The present invention may, of course, be applied to a system comprising a plurality of apparatuses, to an apparatus having only one unit, or to a case wherein processing is performed by supplying a system or an apparatus with a program.

A seventh embodiment of the present invention will now be explained.

Figure 22:
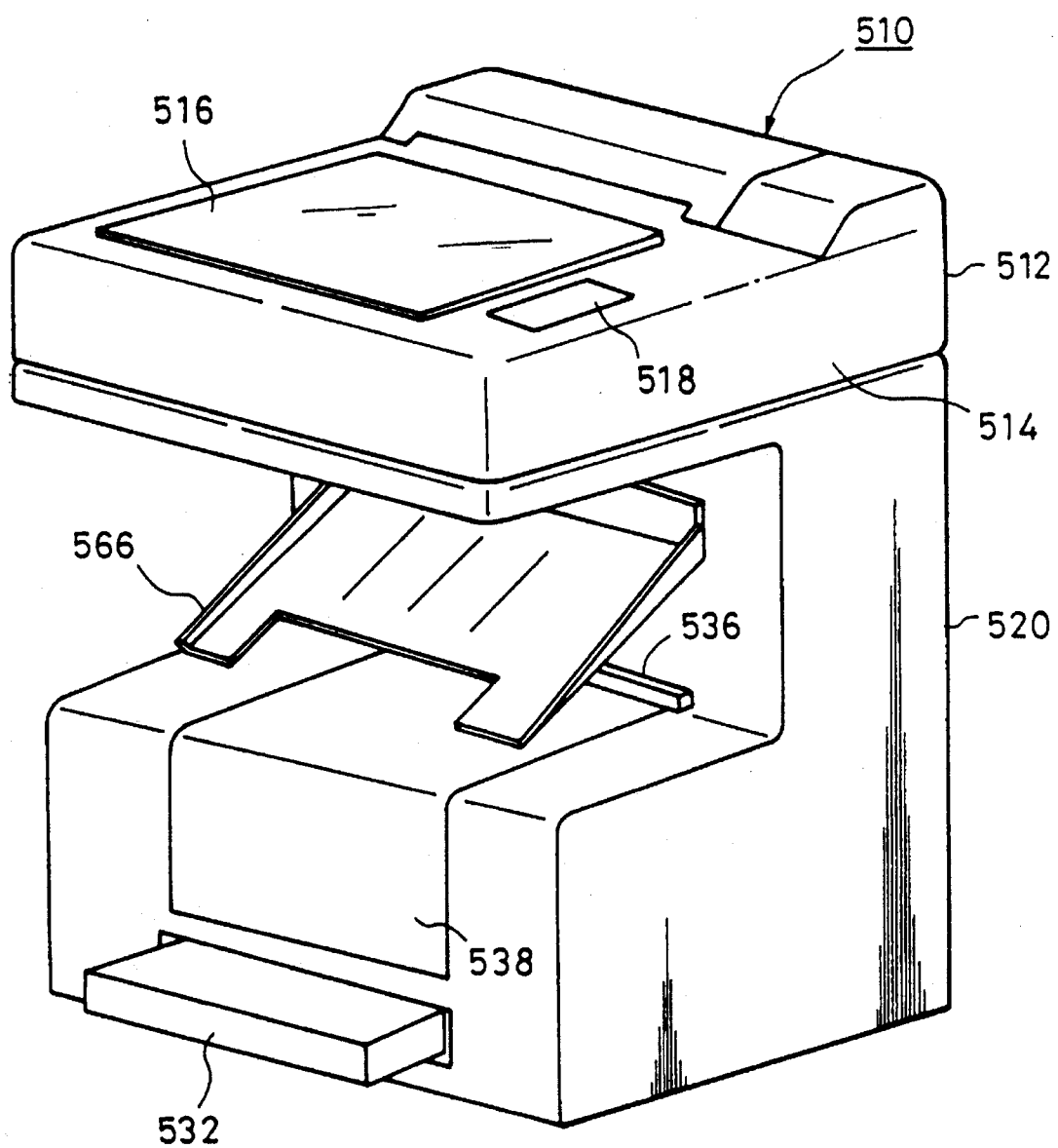
FIG. 22 is a diagram showing an appearance of a digital color copier according to a seventh embodiment of the present invention.

FIG. 22 is an appearance of a digital color copier 510 of the seventh embodiment.

As shown in FIG. 22, the digital color copier 510 is roughly configured by two essential units.

That is, as a first essential unit, there is provided a color image scanner (hereinafter termed a "leader unit") 512 which reads an image of an original in colors and outputs color image data. The leader unit 512 incorporates a controller unit 514 which performs various kinds of image processing of digital color image data and has processing functions, such as interface with external apparatuses, and the like.

As a second essential unit, there is provided a printer unit 520 situated below the leader unit 512 for recording color digital image signals output from the controller unit 514 of the leader unit 512 on recording paper.

The leader unit 512 also incorporates a mechanism for reading image information from one of originals having various shapes and sizes, such as three-dimensional originals, sheet-like originals, large-size sheet-like originals and the like, placed in a face-down state on an original mount (not shown) under an original pressing plate 516.

An operation unit 518 connected to the controller unit 514 is provided at a side of the upper surface of the leader unit 512. The operation unit 518 performs input operations, such as display of various kinds of information, instruction of operations, and the like.

The control unit 514 is configured so as to perform instruction of operations for the leader unit 512 and the printer unit 520 in accordance with information input via the operation unit 518. If it is necessary to perform complicated editing processing or the like, it is possible to mount a digitizer or the like in place of the original pressing plate 516, and to connect the digitizer to the controller unit 514, whereby higher-degree image processing becomes possible.

In the printer unit 520, a full-color ink-jet printer which uses ink-bubble-jet-type recording heads as described in U.S. Pat. No. 4,723,129 is used.

The above-described two essential units may be separated from each other, and are set so that they can be installed at places separated from each other by extending a connecting cable.

The above-described essential units will now be explained in detail with reference to the drawings.

Figure 23:
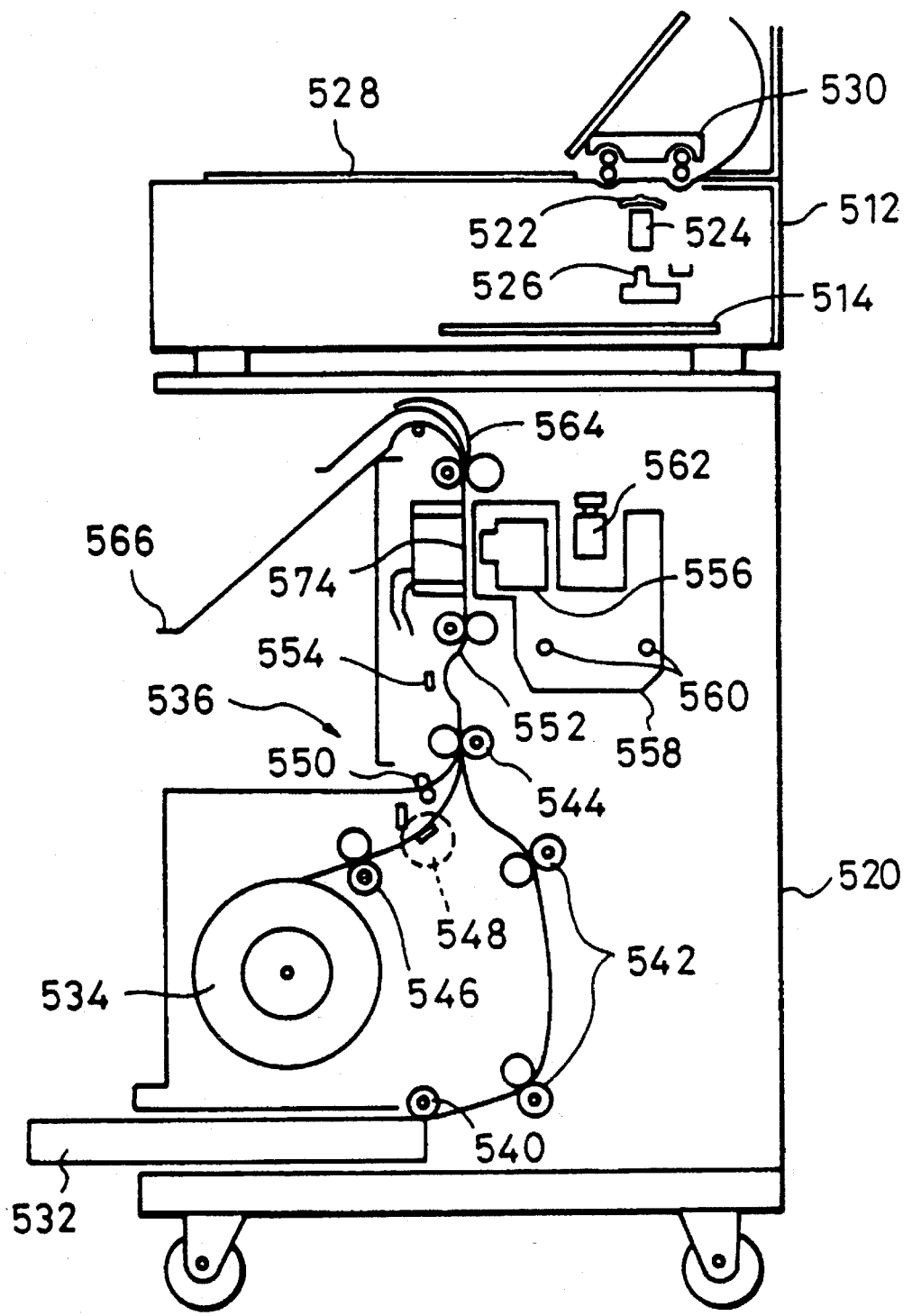
FIG. 23 is a cross-sectional view showing the internal configuration of the digital color copier of the seventh embodiment.

FIG. 23 is a cross-sectional view schematically showing the internal configuration of the digital color copier 510 shown in FIG. 22 as seen from a side.

First, the configuration of the leader unit 512 of the copier 510 will be explained.

In the leader unit 512, an image of an original placed on original-mount glass 528, an image projected by a projector, or an image of a sheet-like original fed by a sheet feeding mechanism 530 is read by an exposure lamp 522, a lens 524, and an image sensor 526 (a CCD (charge-coupled device) is adopted in the present embodiment) which can perform full-color line-image reading.

Various kinds of image processing for image information thus read by the leader unit 512 are performed by the leader unit 512 and the controller unit 514. Subsequently, information which has been read and has been subjected to image processing is transmitted to the printer unit 520, which records an image on recording paper.

In the printer unit 520, recording paper is selectively supplied from a paper feed cassette 532 for accommodating cut paper having a small-format size (up to the A4 14 A3 size in the present embodiment), or from rolled paper 534 for performing recording on large-size paper (up to the A2–A1 size in the present embodiment).

Paper feed is started by an instruction to start printing from the controller unit 814, and paper is first fed to the position of a paper-feed first roller 544 by the following route. In the present embodiment, it is also possible to perform manual paper feed (paper feed from the outside of the apparatus) wherein sheets of recording paper are individually inserted from a manual insertion port 534 along a cover 538 of a paper feed unit.

In the case of feeding recording paper from the paper feed cassette 532 mounted in the printer unit 520, an uppermost sheet of recording paper set in the paper feed cassette 532 is taken out by driving a pickup roller 540 for individually taking out sheets of cut paper from the paper feed cassette 532 provided above a paper-feed end portion of the set surface of recording paper accommodated in the paper feed cassette 532. The sheet is then fed by a cut-paper feed roller 542 which further conveys the sheet to a paper-feed first roller 544.

In the case of rolled paper 534, the roller paper 534 is continuously fed by a rolled-paper feed roller 546, is cut into the length of a format, and the cut sheet is conveyed to the position of the paper-feed first roller 544.

In the same manner, in the case of manually feeding paper from the manual insertion port 536, manually inserted recording paper is conveyed to the paper-feed first roller 544 by a manual insertion roller 550.

The pickup roller 540, the cut-paper feed roller 542, the rolled-paper feed roller 546, the paper-feed first roller 544 and the manual insertion roller 550 are driven by paper-feed motors (not shown, DC servo motors are used in the present embodiment) The system is configured so that on-off control by means of non-periodic rotation drive by electromagnetic clutches attached to the respective rollers can be performed.

Recording paper selectively fed through any of the above-described routes is conveyed to the paper-feed first roller 544. In this paper feed in order to remove skew of recording paper, after forming a predetermined amount of paper loop for the recording paper, the recording paper is conveyed to the paper-feed second roller 552 by being rotatably driven by turning on the paper-feed first roller 544.

The system is configured so that a buffer is provided in the recording paper present between the paper-feed first roller 544 and the paper-feed second roller 552 by sagging the recording paper by a predetermined amount in order to perform an exact paper feeding operation between a paper feed roller 564 disposed above a recording head 556 and a paper feed roller 552 disposed below the recording head 556. A buffer-amount detection sensor 554 for detecting the amount of the buffer, i.e., the amount of sag of the recording paper is disposed in the vicinity of the buffer. Thus, by always providing buffer in the recording paper while the recording paper is conveyed, it is possible to reduce a load applied to the paper feed roller 564 and the paper-feed second rollers 552 particularly when recording paper having a large-size is conveyed, and to perform an exact paper feeding operation.

As described above, the printer unit 520 having a system of conveying recording paper is configured such that in a printing operation by the recording head 556, a scanning carriage 558 on which the recording head 556 is mounted performs a reciprocating movement on a carriage rail 560 by a scanning motor 562 in the direction perpendicular to the plane of FIG. 23 so as to perform scanning in the main scanning direction of the recording paper. In forward scanning, an image is printed on the recording paper by the recording head 556. In backward scanning, an operation of feeding the recording paper by a predetermined amount is performed by the paper feed roller 564.

An amount of feed along the sub-scanning direction is defined as a constant amount of movement (to be described later). In the present embodiment, the amount is set to a length corresponding to the width of the recording head 556 in the sub-scanning direction, that is, though not shown, a length corresponding to the width of a sucking hole formed in the entire surface portion of a platen 574 facing the recording head 556. The sucking hole is provided for the purpose of closely contacting recording paper to the platen 574. In drive control of recording paper by the scanning motor 562 in backward scanning, the amount of buffer is controlled so as to be always a predetermined amount while detecting the amount of buffer by the buffer-amount detection sensor 554. The recording paper on which an image is printed is discharged onto a paper discharge tray 566, and a series of the above-described printing operations are completed.

Next, the configuration of a portion near the scanning carriadge 558 will be explained in detail with reference to FIG. 24.

Figure 24:
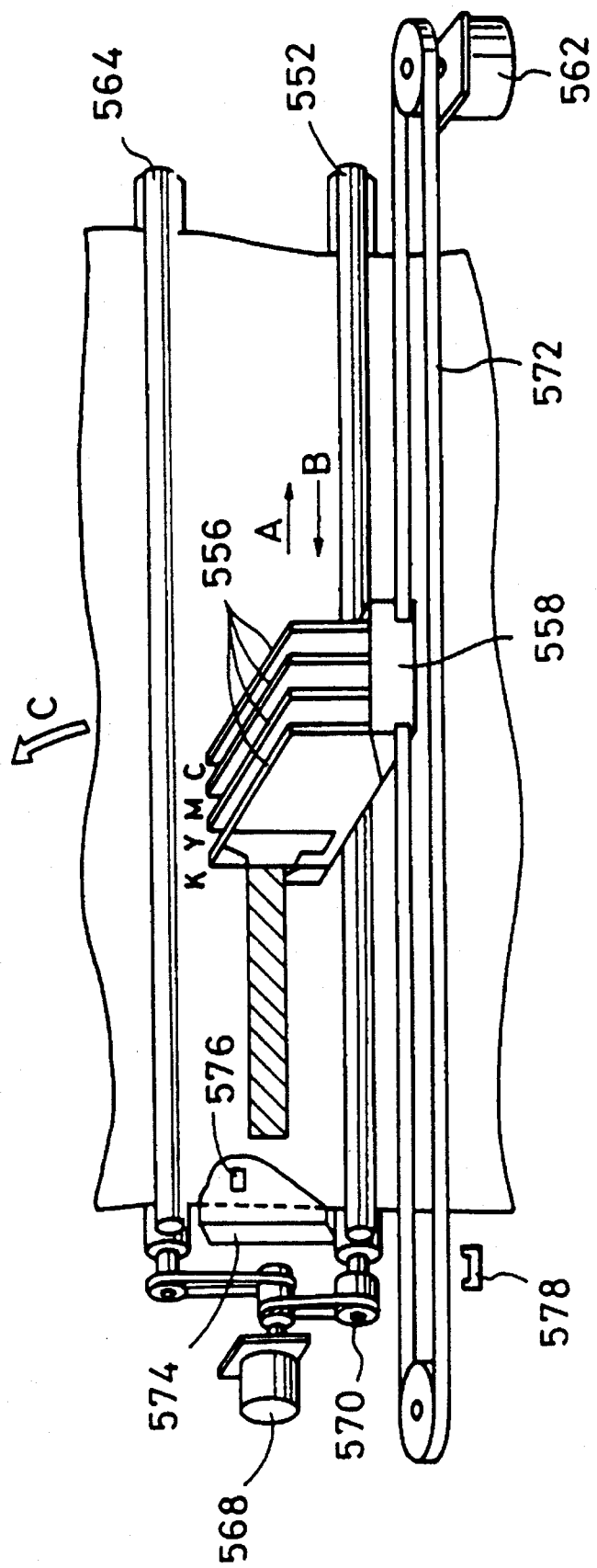
FIG. 24 is a diagram showing the configuration of a scanning carriage of the seventh embodiment.

In FIG. 24 a paper feed motor 568 serves as a driving source for intermittently feeding recording paper in the sub-scanning direction. The amount of rotation of the paper feed motor 568 can be arbitrarily set and changed, and is configured so that the paper-feed second roller 552 is driven via a clutch 570 for the paper feed rollers 564 and the paper-feed second rollers 552.

The above-described scanning motor 562 is provided as a driving source for performing reciprocating scanning of the scanning carriadge 558 via a scanning belt 572 in the main scanning directions indicated by arrows A and B. In the present embodiment, pulse motors are used as the paper feed motor 568 and the scanning motor 562, since exact paper feed control at an arbitrary feed amount is unnecessary. A paper pressing member (not shown) is disposed at a position facing the lower end of the platen 574, and controls so as not to produce, for example, movement of recording paper by securing the recording paper against the platen 574 during scanning of the scanning carriadge 556.

When the recording paper reaches the paper-feed second rollers 552, the clutch 570 for the paper-feed second roller and the paper feed motor 568 are turned on, and the recording paper is conveyed on the platen 574 until the leading end of the recording paper is grasped by a pair of paper feed rollers 564. A paper detection sensor 576 provided on the platen 574 detects that the conveyed recording paper has passed through the platen 574. Sensor information is utilized for position control, jam control and the like.

When the leading end of the recording paper reaches the paper feed rollers 564, the clutch 570 for the paper-feed second rollers and the paper feed motor 568 are turned off. Subsequently, negative pressure is provided in the internal space of the platen 574 by the start of a suction motor (not shown) to start a sucking operation. By such a sucking operation, the recording paper is made to be in close contact with the platen 574. At the same time, the abovedescribed paper pressing member secures the recording paper against the platen 574.

Before an image printing operation on the recording paper, the scanning carriadge 558 is moved to a position where a home position sensor 578 is disposed, and subsequently forward scanning is performed in the direction of arrow A.

In this forward scanning, the recording head 556 discharges a proper amount of cyan "C", magenta "M", yellow "Y"0 and black "B" inks to perform recording (printing) of an image. After the completion of an image recording operation for a predetermined length in the main scanning direction, the driving direction of the scanning motor 562 is reversed to move the scanning carriadge 558 in the reverse direction, i.e., in the direction of arrow D to start a backward scanning. The scanning motor 562 is subjected to reverse driving until the scanning carridge 558 returns to the position of the home position sensor 578.

During this backward scanning, by rotating the paper feed rollers 564 by starting the paper feed motor 568, a paper feed operation for a length recorded by the recording head 556 in the sub-scanning direction indicated by arrow C (i.e., the width of the recording head 556) is performed. In the present embodiment, the paper feed amount, that is, the amount of movement in the sub-scanning direction is not necessarily set to a constant amount of movement for the width of the recording head 556, but may be set to half an amount of movement defined by a final line width.

In the present embodiment, the recording head 556 comprises ink-jet nozzles, and 256 nozzles in total are assembled for each color of Y, M, C and K.

When the scanning carriadge 558 stops at a home position defined by the home position sensor 578, a recovering operation of the recording head 556 is performed. The recovering operation is performed in order to perform a stable recording operation, and is processing for preventing uneven discharge at the start of discharge caused by a change in the viscosity of ink remaining in the nozzles of the recording head 556, and the like. In this processing, pressurizing operations for the respective nozzles of the recording head 556 are performed according to preprogrammed conditions, such as paper feed time, temperature in the apparatus, discharge time and the like, and discharging operations without ink are performed from the respective nozzles.

By repeating the above-described operation, desired image recording is performed over the entire surface of the recording paper.

Figure 25:
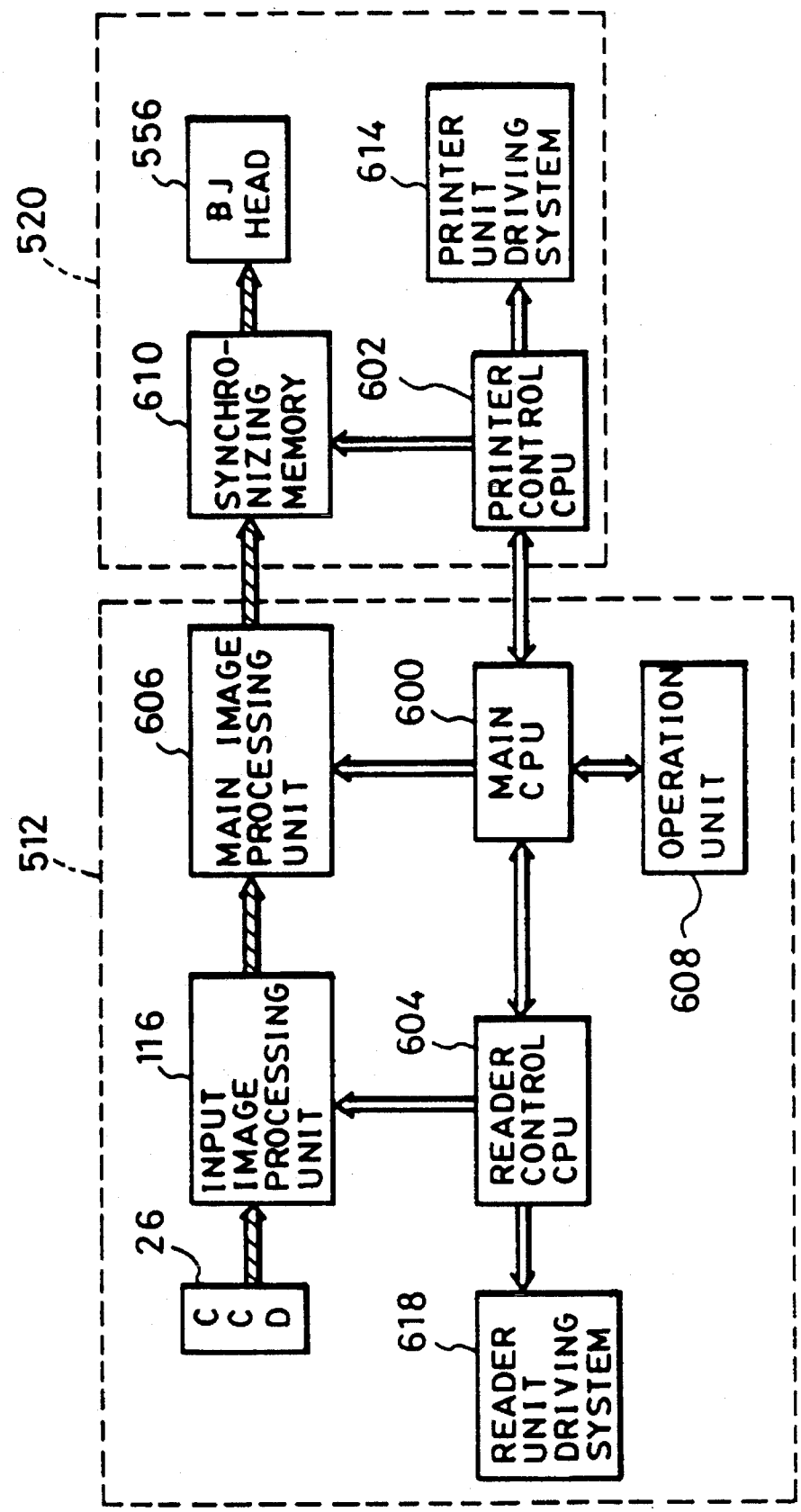
FIG. 25 is a block diagram showing the configuration of a control system in the seventh embodiment.

Next, an explanation will be provided of processing and control of image signals in a control system of the digital color copier 510 of the present embodiment with reference to FIG. 25.

In FIG. 25, A main CPU 600 controls the entire apparatus. A printer control CPU 602 for performing control operations of a printer, a reader control CPU 604 for performing reading control operations, a main image processing unit 606 for processing image display operations, and an operation unit 608, serving as an input unit by the operator, are connected to the main CPU 600. The printer control CPU 602 and the reader control CPU 604 perform operation controls of the printer unit 520 and the reader unit 512, respectively, and are set in a master-and-slave relationship with the main CPU 600. The main image processing unit 606 is an image processing unit for performing edge emphasis smoothing, masking, black extraction, binary coding, trimming and the like.

A synchronizing memory 610 is connected to the printer control CPU 602 and the main image processing unit 606. The synchronizing memory 610 performs absorption of time variances of input operations and delay correction due to the configurational arrangement of the recording head 556. The output of the synchronizing memory 610 is connected to the recording head 556. The printer control CPU 602 is connected to a printer unit driving system 614 for performing input drive control of the printer unit 520.

The reader control CPU 604 is connected to an input image processing unit 616 for performing correction processing necessary in a reading system, such as shading correction, color correction, γ-correction and the like, and a reader unit driving system 618 for controlling input drive of the reader. A CCD line sensor 620 is connected to the in put image processing unit 616, which is connected to the main image processing unit 606.

As described above, the reader unit 512 in the present embodiment comprises the main CPU 600, the reader control CPU 604, the main image processing unit 606, the operation unit 608, the input image processing unit 616, the reader unit driving system 618, and the CCD line sensor 526, serving as an image sensor the printer unit 520 comprises the printer control CPU 602, the synchronizing memory 610, the recording head 556, and the printer unit driving system 614.

Figure 26:
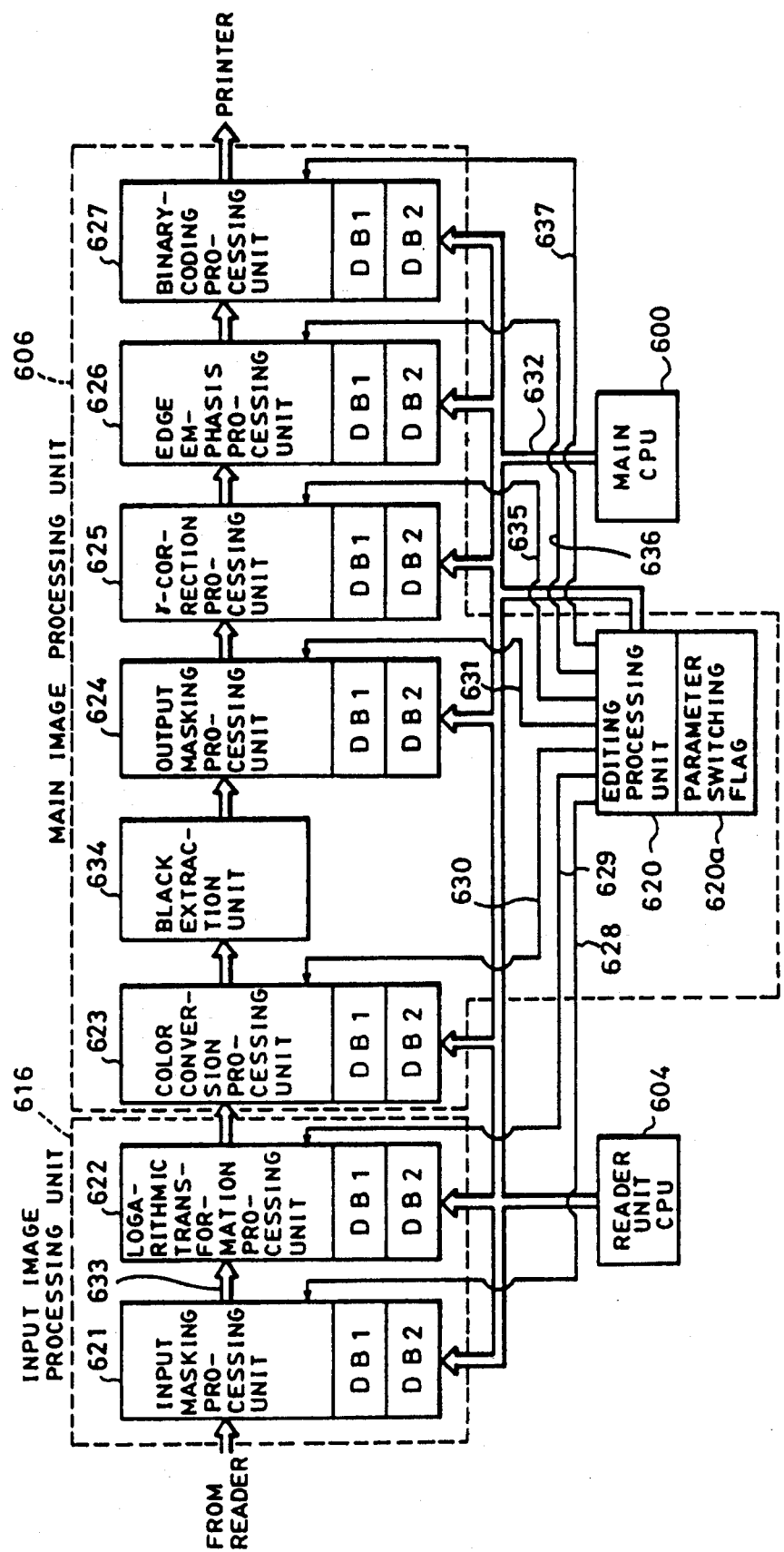
FIG. 26 is a block diagram showing the configuration of a main image processing unit and an input image processing unit.

Next, an explanation will be provided of the configuration of the main image processing unit 606 and the input image processing unit 616, which are the most characteristic portions in the reader unit 512, with reference to FIG. 26.

In FIG. 26, the input image processing unit 616 comprises an input masking processing unit 621 and a logarithmic transformation processing unit 622. An editing processing unit 620 controls the respective processing units of the main image processing unit 606. A parameter switching flag storage area 620a is incorporated in the editing processing unit 620 A color conversion processing unit 623 performs color conversion processing of image signals. An output masking processing unit 624 performs masking processing. A γ-correction processing unit 625 performs γ-correction. An edge emphasis processing unit 626 performs processing, such as edge-emphasis smoothing and the like. A binary-coding processing unit 627 performs binary-coding processing of an image. A black extraction unit 634 forms a black component (K) from C, M and Y data. In the present embodiment, the main image processing 606 has the above-described configuration. Data setting in the respective image processing units is performed from the main CPU 600 and the reader unit CPU 604 via a data bus 632.

Each of the respective image processing units in the present embodiment has two data banks. Each unit selects one of the data banks in accordance with control signals 628–631 and 635–637 from the editing processing unit 620, and executes image processing according to parameters set by the selected data bank. A pattern of selection of a data bank for each image processing unit is set from the main CPU 600 via the data bus 63° in accordance with image processing to be executed.

Figure 27:
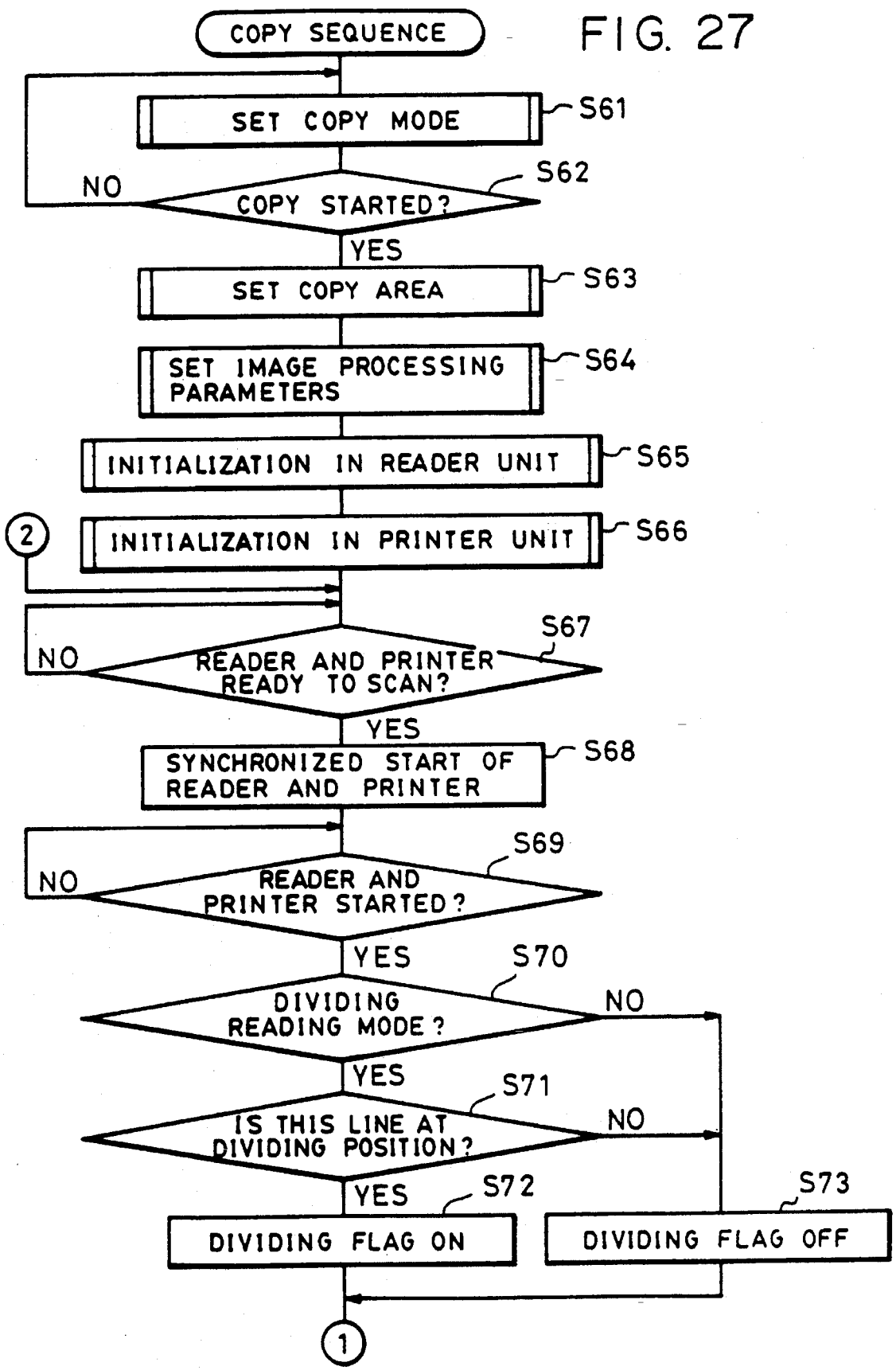
FIGS. 27, 28 and 29 are flowcharts showing a copy sequence in the seventh embodiment.
Figure 28:
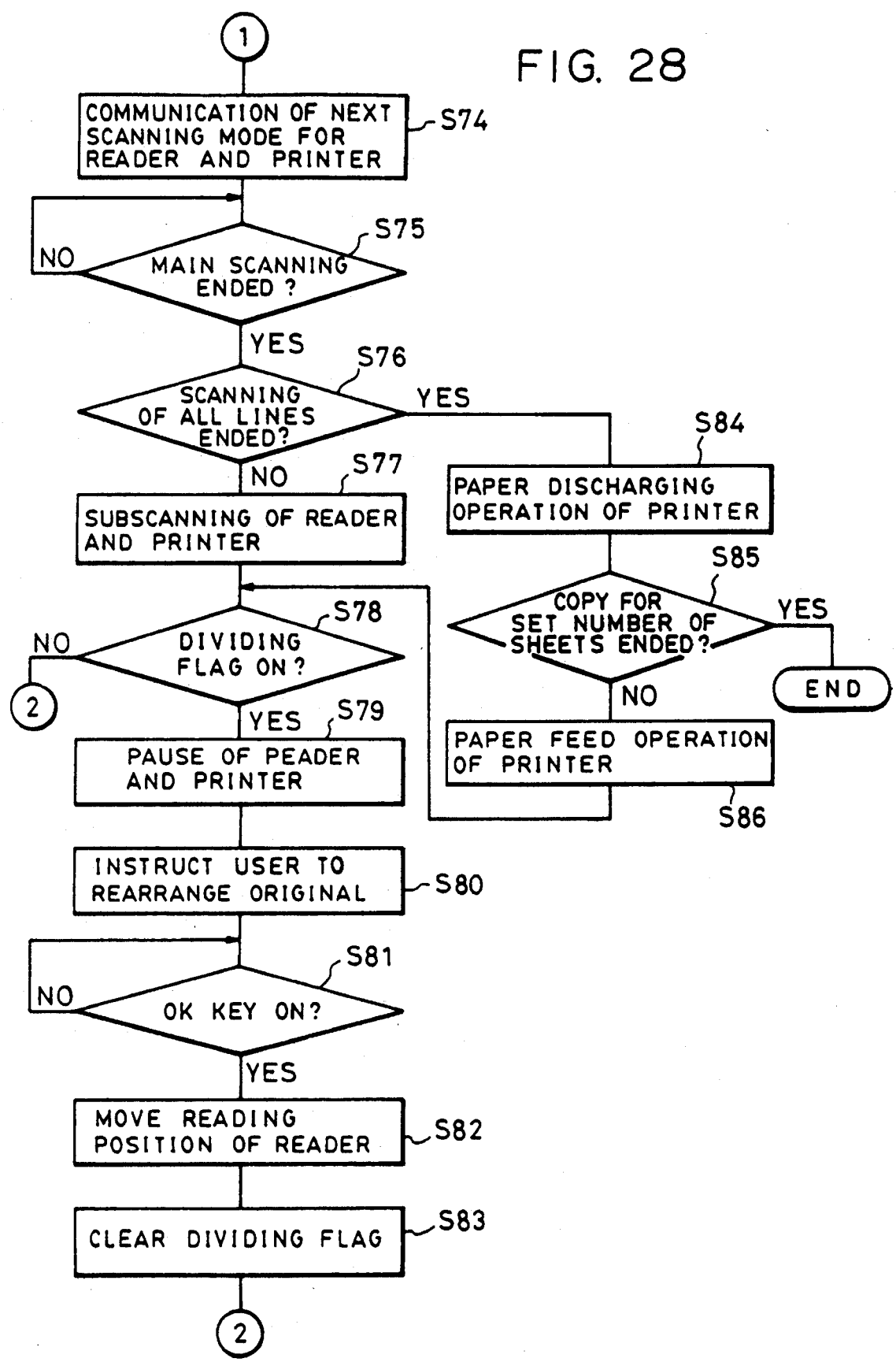
Figure 29:
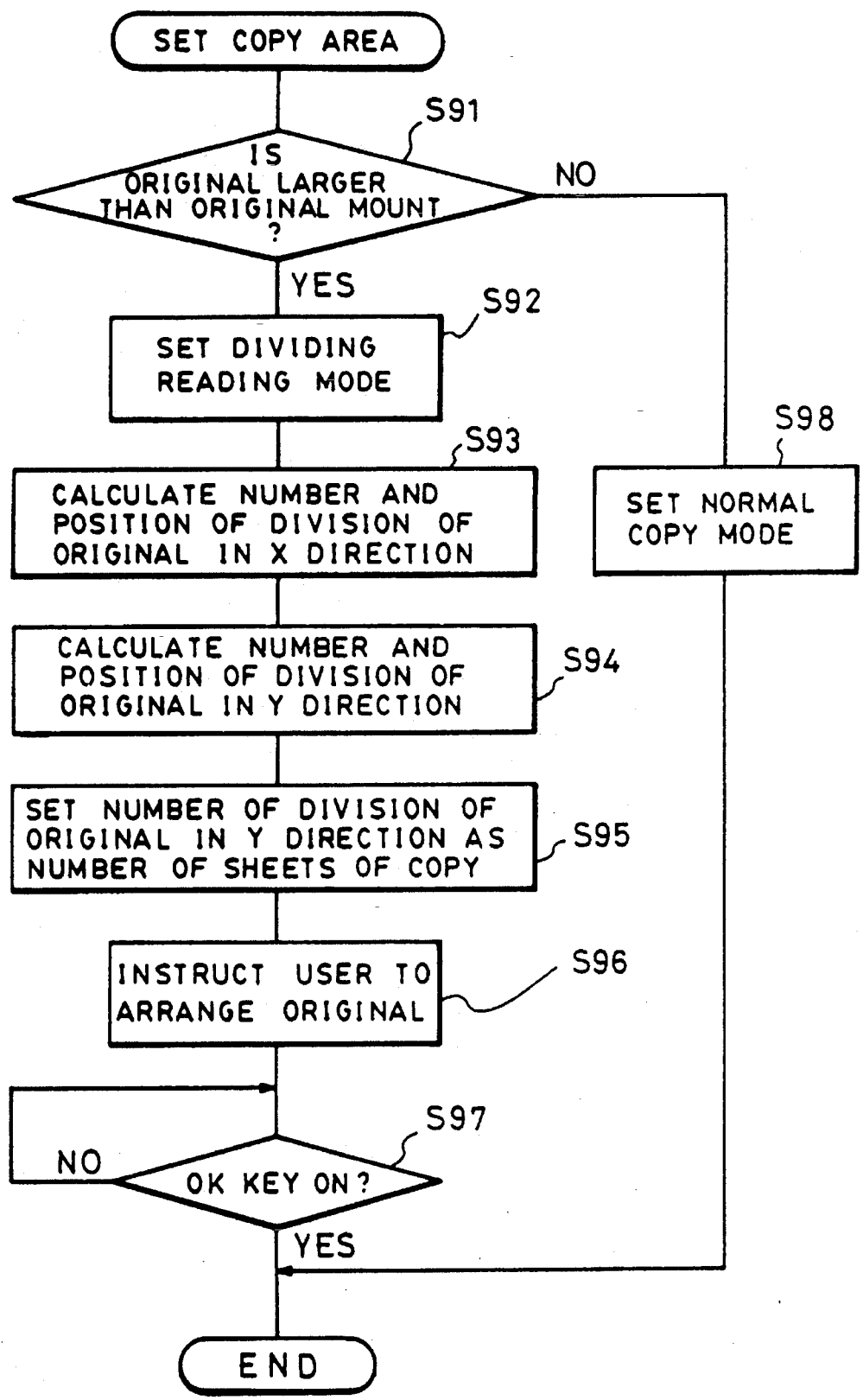

Next, an explanation will be provided of a copy sequence controlled by the main CPU 600, the reader control CPU 604 and the printer control CPU 602 with reference to flowcharts shown in FIGS. 27–29.

First, in step S61 shown in FIG. 27 the user sets an arbitrary copy mode, such as the size of an original, print size, magnification, image processing and the like, via the operation unit 608. The setting can be reset until "a start button" is pressed in the next step S62 and a copying operation is started. If a copying operation is started in step S62, the process proceeds to step S63, where a copy area set in accordance with the size of an original assigned by the user.

Next, the detail of the setting processing will be explained with reference to the flowchart shown in FIG. 29.

Figure 30:
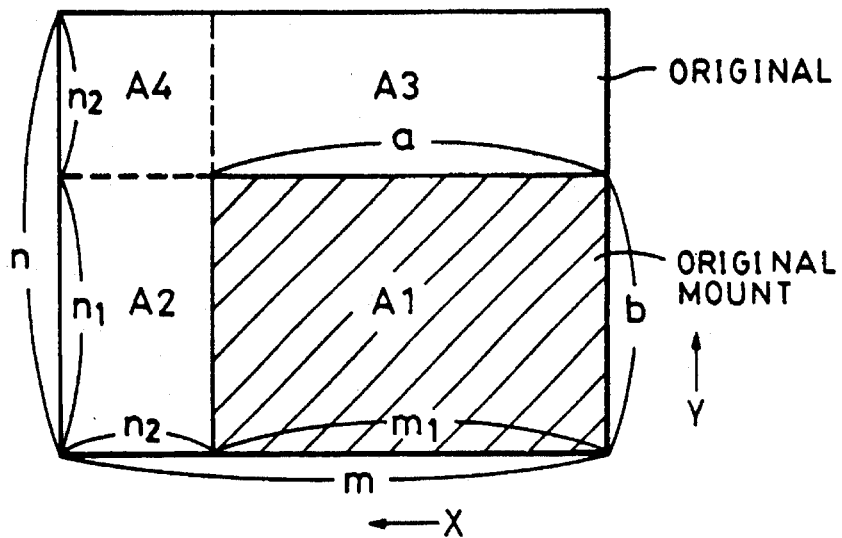
FIG. 30 is a diagram illustrating division of an original in the seventh embodiment.

In step S91, the main CPU 600 determines whether or not the size of the original is larger than the original mount. If the result of the determination is negative, the process proceeds to step S98, where a normal copy mode is set. If the result of the determination is affirmative, the process proceeds to step S92, where a dividing reading mode is set. Subsequently, in step S93, the original is divided in the X direction, and the number and positions of division are calculated. For example, as shown in FIG. 30, if an original having a size of m×n which is larger than the original mount having a size of a×b is divided, the original is divided into two portions $m_1$ and $m_2$ in the X direction. The dividing position $m_1$ is set so as to equal the size of the original in the X direction, that is, $m_1=a$. In step S44, in the same manner, the original is divided into two portions $n_1$ and $n_2$ in the Y direction. The dividing position $n_1$ is set so as to equal the size of the original in the Y direction, that is, $n_1=b$. As a result, the original is divided into four areas $A_1=m_1 \times n_1$, $A_2=m_2 \times n_1$, $A_3=m_1 \times n_2$ and $A_4=m_2 \times n_2$.

Figure 31:
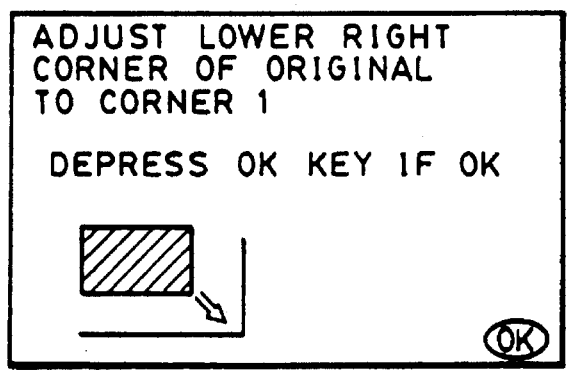
FIG. 31 is a diagram showing a message indicating arrangement of an original on an original mount.
Figure 32:
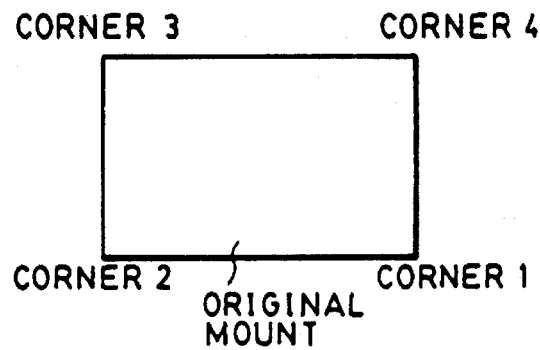
FIG. 32 is a diagram showing respective corners of the original mount.

In step S95, the number of division in the Y direction is registered as the number of copies. In the case of FIG. 30, since each of areas $A_1$ and $A_2$, and areas $A_3$ and $A_4$ is printed on one sheet of rolled paper, the number of copies is two. In the next step S96, the arrangement of the original is instructed to the user. More specifically, a message as shown in FIG. 31 is displayed on the operation unit 608. Corner 1 indicated in the message of FIG. 31 is one of designations predetermined for respective corners of the original mount, as shown in FIG. 32.

When the user has arranged the original and an "OK key" has been turned on in step S97, the processing in this subroutine is completed, and the process proceeds to step S64 shown in FIG. 27. In step S64, various kinds of image processing parameters are set in accordance with the mode set in the above-described step S61. In step S65, the reader unit 521 performs initialization necessary for a copying operation, such as shading correction, light-amount adjustment and the like, is performed. In the next step S66, the printer unit 520 performs initialization necessary for a copying operation, that is, paper feed and the recovering operation of the head.

After confirming a ready-to-scan state of the reader unit 512 and the printer unit 520 in step S67, in step S68, start commands are issued for the reader unit 512 and the printer unit 520 with a timing of synchronizing the two units. In step S69, the start of main scanning of the reader unit 512 and the printer unit 520 is confirmed, and the process proceeds to step S70, where the main CPU 600 determines whether or not the dividing reading unit mode is set. If the result of the determination is affirmative, the process proceeds to step S71, where the main CPU 600 determines whether or not the line currently being scanned corresponds to the dividing position. In the case of FIG. 30, this processing is processing to determine whether or not the line corresponds to the end point of area $A_1$ in the X direction, that is, the position $m_1$. If the result of the determination is affirmative, the process proceeds to step S72, where a dividing flag is set to be on. If the result of the determination is negative, the dividing flag is set to be off.

Figure 33:
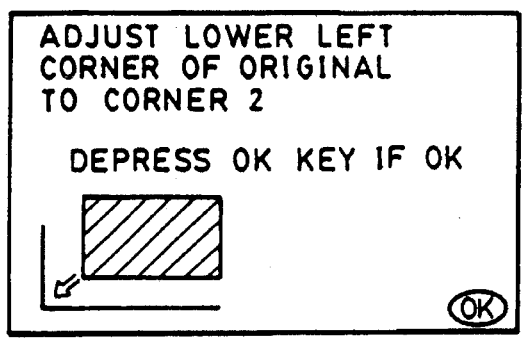
FIG. 33 is a diagram showing a message indicating arrangement of an original on the original mount.
Figure 34:
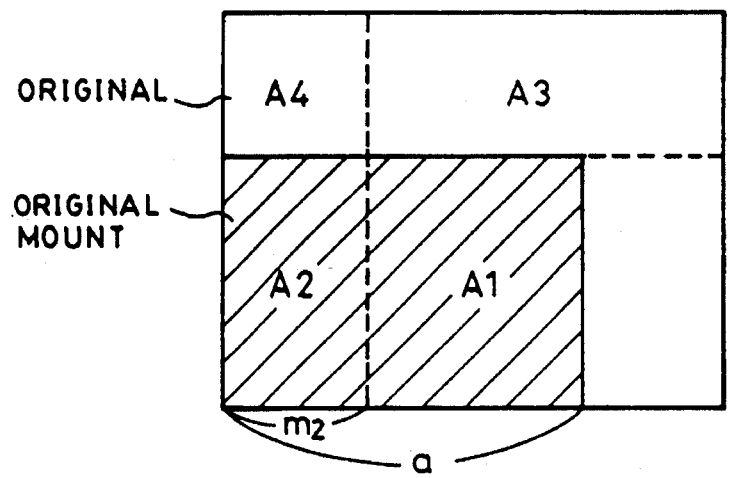
FIG. 34 is a diagram illustrating movement to divided positions.

After setting the dividing flag, the process proceeds to the next step S74, where information necessary for the subsequent scanning, such as the amount of sub-scanning feed and the like, is transmitted to the reader unit 512 and the printer unit 52. Subsequently, in step S75, the end of main scanning is awaited If the main scanning has ended, the process proceeds to step S76, where the main CPU 600 determines whether or not scanning of all lines has ended, that is, a copying operation for one sheet has ended. If the result of the determination is negative, the process proceeds to step S77, where the start of a sub-scanning operation is instructed to the reader unit 512 and the printer unit 520. In the next sep S78, the main CPU 600 determines whether the dividing flag is on or off. If the result of the determination is negative, the process returns to step S67. If the result of the determination is affirmative, the process proceeds to step S79, where a temporary stop of the copying operation is instructed to the reader unit 512 and the printer unit 52. In step S80, rearrangement of the original is instructed to the user. For example, when printing of area $A_1$ shown in FIG. 30 has ended, a message as shown in FIG. 33 is displayed for performing copy of the next area $A_2$. In step S81, depression of the "OK key" is awaited after the rearrangement of the original. When the key has been depressed, the process proceeds to step S82, where the reader carriadge is moved to the leading position of the area to be subsequently copied. That is, as shown in FIG. 34, since area $A_2$ to be copied is arranged in the above-described step S80 so that the lower left corner of the original is adjusted to corner 2 of the original mount, the reader carriadge must be moved to the position $a-m_2$ in the sub-scanning direction. After the completion of the movement, the process proceeds to step S83, where the dividing flag is cleared, and the process returns to the aboved-described step S67.

On the other hand, if the main CPU 600 determines in step S76 that scanning of all lines has ended, that is, copying of one sheet has ended, the process proceeds to step S84, where a paper discharging operation by the printer is performed. In step S85, the main CPU 600 determines whether or not copy for a set number of sheets has ended. For example, if copy has ended until area A4 shown in FIG. 30, the result of the determination is affirmative, since no other areas to be copied are present. If the result of the determination is negative, the process proceeds to step S86, where a paper feed operation of the printer is performed, and the process proceeds to the above-described step S78. If the result of the determination is affirmative, the copying operation is terminated.

Figure 38A:
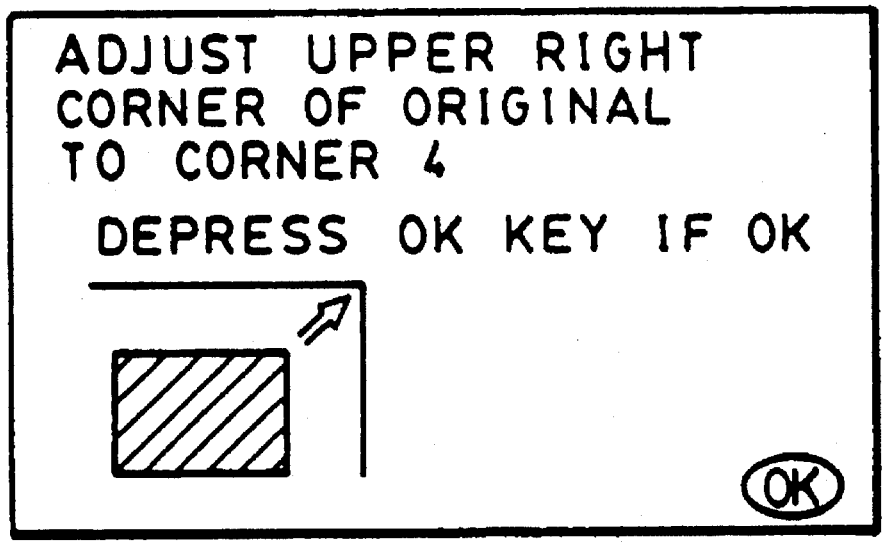
FIGS. 38(a) and 38(b) are diagrams showing messages for indicating arrangement of an original on an original mount.
Figure 38B:
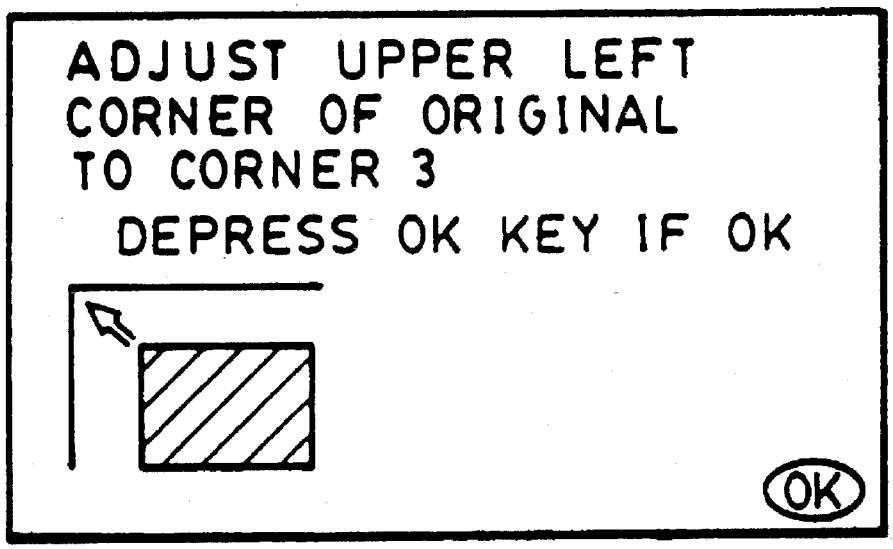

After the completion of copy of areas $A_1$ and $A_2$, copy of area $A_3$ is performed. At that time, in step S80, display as shown in FIG. 38(a) appears, and the reader carriage is controlled so as to read area $A_3$ for the original arranged as instructed. When copy of area $A_3$ has ended and the process moves to copy of area $A_4$, a display as shown in FIG. 38(b) appears, and the reader carriage is controlled so as to read area $A_4$.

As described above, the present embodiment has the advantage that a reading operation of an original having a size larger than the size of an original mount can be smoothly performed without using a complicated mechanism.

Although, in the above-described embodiment, the dividing position is fixed to the end portion of the original mount, the dividing position may be arbitrarily set.

Figure 35:
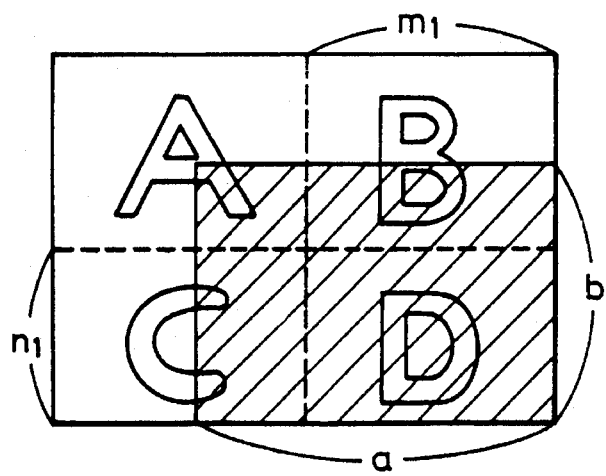
FIG. 35 is a diagram illustrating division of an original in the seventh embodiment.

As in the above-described embodiment, when reading an original having a size larger than the original mount having the size of a×b, the original is read by dividing it into two portions in the X direction and into two portions in the Y direction, that is, into four areas, as shown in FIG. 35. In FIG. 35, broken lines indicate dividing positions. In the present example, no image is present at position $m_1$ in the X direction and position n1 in the Y direction. Hence, such dividing positions do not influence images even if deviation of the images occurs.

In processing of setting a copy mode in step S61 shown in FIG. 27, the user may arbitrarily set dividing positions It is also possible to control so that optimum dividing positions are automatically determined from image data by previously prescanning an original.

Although, in the above-described embodiment, an image read from an original having a size larger than the original mount is printed in the original form, it is also possible to freely set the layout of printout.

When laying out an image shown in FIG. 36(a) in a form shown FIG. 36(b), the image in area 4 is first read and printed. After the completion of reading of area 4, rearrangement of the original is instructed to the user in order to read area 1 in step S80 shown in FIG. 28. Subsequently, the system controls so as to read area 4.

It is thereby possible to perform desired layout processing by reading an original having a size larger than the original mount.

Although, in the above-described embodiment, an LCD display is used as the operation unit, the present invention is not limited to this configuration. Any other device may be used provided that it can instruct rearrangement of the original, and the like to the user.

Although, in the above-described embodiment, a digital color copier has been illustrated, the present invention may be also applied to a case wherein a single unit of reader is used as a reading device, which is connected to a computer. Signals to be handled are, of course, not necessarily color signals.

The present invention may be applied to a system configured by a plurality of apparatuses, or to an apparatus comprising a single unit. Furthermore, the present invention may, of course, be applied to a case wherein the object of the invention is achieved by supplying a system or an apparatus with programs.

As explained above, according to the present invention, it becomes possible to smoothly read an original having a size exceeding the size of an original mount.

What is claimed is:

1. An image processing apparatus, comprising:

input means for inputting images;

storage means for storing the images input from said input means, said storage means storing a plurality of images having common partial images;

characteristics extraction means for extracting characteristics of images input from the input means;

determination means for determining positions of respective overlapped common partial images of the plurality of images stored in said storage means based on the image characteristics extracted in said characteristics extraction means;

synthesis means for forming an image by synthesizing said plurality of images according to a result of the determination by said determination means; and output means for outputting the image synthesized by said synthesis means.

2. An image processing apparatus according to claim 1, wherein the characteristics extracted by said characteristics extraction means comprise an image depicted by a specific color.

3. An image processing apparatus according to claim 1, wherein the characteristics extracted by said characteristics extraction means comprise a contour of the image.

4. An image processing apparatus according to claim 1, further comprising a mount for mounting an original, and wherein said input means comprises a scanner for reading an image of the original mounted on said mount, and wherein said output means comprises a printer for recording an image on a sheet.

5. An image processing apparatus according to claim 1, further comprising a mount for mounting an original, and wherein said input means performs a plurality of read operations in order to read the entirety of an image of the original which is larger than said mount.

6. An image processing apparatus according to claim 1, wherein said input means performs a plurality of read operations in order to read a plurality of images.

7. An image processing apparatus according to claim 1, wherein said characteristics include a mark made by a marker pen.

8. An image processing apparatus according to claim 7, further comprising removing means for removing said mark.

9. A method for forming an image comprising the steps of:

sequentially inputting a plurality of images having common partial images;

storing a plurality of images;

extracting characteristics of images input in the input step;

determining positions of respective overlapped common partial images of the plurality of images stored in said storing step based on the image characteristics extracted in said extracting step;

forming an image by connecting and synthesizing said plurality of images according to a result of determination; and outputting the image formed in said image forming step.

10. A method for forming an image according to claim 9, wherein the characteristics extracted in said extracting step comprise an image depicted in a specific color.

11. A method for forming an image according to claim 9, wherein the characteristics extracted in said extracting step comprise a contour of an image.

12. A method for forming an image according to claim 9, further comprising a step of mounting an original on a mount, and wherein said plurality of images having common partial images are sequentially input by a scanner for reading an image of the original mounted on said mount, and wherein said image formed in said image forming step is output by a printer for recording an image on a sheet.

13. A method for forming an image according to claim 9, further comprising a step of mounting an original on a mount, and wherein said inputting step includes a plurality of read operations performed in order to read an entirety of an image of the original which is larger than said mount.

14. A method for forming an image according to claim 9, wherein said inputting step includes a plurality of read operations in order to read the plurality of images.

15. A method for forming an image according to claim 9, wherein said characteristics include a mark made by a marker pen.

16. A method for forming an image according to claim 15, further comprising a step of removing said mark.

17. An image processing apparatus, comprising:

input means for inputting a predetermined amount of image data;

first storage means for storing the predetermined amount of image data input by said input means;

extraction means for extracting certain characteristics according to the predetermined amount of image data input by said input means;

second storage means for storing the characteristics extracted by said extraction means;

control means for controlling repetition of operations of said input means, said first storage means, said extraction means, and said second storage means;

connection means for connecting at least two of the predetermined amount of image data obtained by said control means according to characteristics corresponding to each of the predetermined amount of image data; and output means for outputting image data obtained by the connection by said connection means.

18. An image processing apparatus according to claim 17, wherein said certain charasteristics comprise an edge.

19. An image processing apparatus according to claim 17, wherein an apparatus as an output target of said output means comprises a printing apparatus.

20. An image processing method, comprising the steps of:

inputting a predetermined amount of image data;

storing, in a first storage means, the predetermined amount of image data input in said input step;

extracting certain characteristics according to the predetermined amount of image data input in said input step;

storing, in a second storage means, the characteristics extracted in said extracting step;

controlling repetition of operations of an input means, said first storing means, an extracting means, and said second storing means;

connecting at least two predetermined amounts of image data obtained in said controlling step according to characteristics corresponding to each of the predetermined amounts of image data; and outputting image data obtained by the connection in said connecting step.

21. An image processing method according to claim 20, wherein, in said extracting step, said certain characteristics being extracted include an edge.

22. An image processing method according to claim 20, wherein, in said outputting step, image data is output to a printing apparatus.

23. An image processing apparatus comprising:

reading means for reading a plurality of times an entire image of an original having a size larger than a mount for mounting the original;

storing means for storing read images;

pattern matching means for performing a pattern matching of the plurality of images stored in said storing means;

determining means for determining positions of respective overlapped common partial images of the plurality of stored images in accordance with a result of the pattern matching of said pattern matching means;

processing means for connecting and synthesizing said plurality of images in accordance with a result of the determination of said determining means; and outputting means for outputting the image processed by said processing means.

24. A method for forming an image comprising the steps of:

reading a plurality of times an entire image of an original having a size larger than a mount for mounting the original;

storing read images;

performing a pattern matching of the plurality of stored images;

determining positions of respective overlapped common partial images of the plurality of stored images in accordance with a result of the pattern matching;

forming an image by connecting and synthesizing said plurality of images in accordance with a result of the determination; and outputting the image formed in said image forming step.

25. An image processing apparatus, comprising:

a mount for mounting an original;

reading means for reading the original mounted on said mount, said reading means reading the original a plurality of times in order to read an entire image of the original which is larger than said mount; and image synthesis means for synthesizing a plurality of images read by said reading means into a synthesized image corresponding to the entire image of the original.

26. An image processing apparatus according to claim 25, further comprising reducing means for reducing the synthesized image.

27. An image processing method, comprising the steps of:

mounting an original on a mount;

reading the original mounted on said mount, said reading step including reading the original a plurality of times in order to read an entire image of the original which is larger than said mount; and synthesizing a plurality of images read in said reading step into a synthesized image corresponding to the entire image of the original.

28. An image processing method according to claim 27, further comprising a step of reducing the synthesized image.

* * * * *

UNITED STATES PATENT AND TRADEMARK OFFICE
CERTIFICATE OF CORRECTION

PATENT NO. : 5,465,163
DATED : November 7, 1995
INVENTOR(S) : Kunio Yoshihara, et al.

It is certified that error appears in the above-indentified patent and that said Letters Patent is hereby corrected as shown below:

COLUMN 12

Line 31, "$(x_1+x_1'-x_a',Y_1)$" should read --$(x_1+x_1'-x_a'Y_1)$--.

COLUMN 15

Line 46, "A4" should read --A4-A3--;
Line 47, "14 A3" should be deleted; and
Line 51, "814," should read --514,--.

COLUMN 17

Line 49, ""Y"0" should read --"Y"--.

COLUMN 19

Line 27, "63°" should read --632--.

COLUMN 20

Line 53, "52." should read --520.--.

Signed and Sealed this

Sixteenth Day of April, 1996

BRUCE LEHMAN

Attest:

Attesting Officer

Commissioner of Patents and Trademarks